(12) United States Patent
Ogasahara et al.

(10) Patent No.: US 12,429,255 B2
(45) Date of Patent: Sep. 30, 2025

(54) MAGNETIC HEAT PUMP AND MAGNETIC REFRIGERATION CYCLE APPARATUS

(71) Applicant: Mitsubishi Electric Corporation, Tokyo (JP)

(72) Inventors: Atsushi Ogasahara, Tokyo (JP); Shun Tonooka, Tokyo (JP); Tetsuya Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 379 days.

(21) Appl. No.: 17/919,309

(22) PCT Filed: May 28, 2020

(86) PCT No.: PCT/JP2020/021212
§ 371 (c)(1),
(2) Date: Oct. 17, 2022

(87) PCT Pub. No.: WO2021/240751
PCT Pub. Date: Dec. 2, 2021

(65) Prior Publication Data
US 2023/0152010 A1 May 18, 2023

(51) Int. Cl.
F25B 21/00 (2006.01)
(52) U.S. Cl.
CPC ...... *F25B 21/00* (2013.01); *F25B 2321/0022* (2013.01); *F25B 2500/05* (2013.01)
(58) Field of Classification Search
CPC ........ F25B 2321/002; F25B 2321/0021; F25B 21/00; F25B 2321/0022; F04D 29/305; F04D 29/382
See application file for complete search history.

(56) References Cited

U.S. PATENT DOCUMENTS

| | | | | |
|---|---|---|---|---|
| 4,755,105 A | * | 7/1988 | Blakeslee | F04D 27/00 416/240 |
| 2011/0215088 A1 | * | 9/2011 | Muller | H10N 15/20 219/618 |

(Continued)

FOREIGN PATENT DOCUMENTS

| | | | | |
|---|---|---|---|---|
| EP | 1736717 A1 | * | 12/2006 | F25B 21/00 |
| JP | 2017-522532 A | | 8/2017 | |

(Continued)

OTHER PUBLICATIONS

International Search Report and Written Opinion mailed on Aug. 4, 2020, received for PCT Application PCT/JP2020/021212, filed on May 28, 2020, 10 pages including English Translation.

*Primary Examiner* — Jianying C Atkisson
*Assistant Examiner* — Esmeralda Arreguin-Martinez
(74) *Attorney, Agent, or Firm* — XSENSUS LLP

(57) ABSTRACT

A magnetic heat pump includes magnetocaloric members, an impeller, deformable members, a casing, an electric motor, and a magnetic field generator. The impeller has accommodation chambers. The deformable members face the accommodation chambers. The casing has an interior space accommodating the magnetocaloric members, the impeller, and the deformable members and allowing a heat transport medium to circulate, a first inlet, and a first outlet spaced apart from the first inlet in the circumferential direction. The magnetic field generator produces a magnetic field becoming stronger along the first direction, in a first region extending from the first inlet to the first outlet in the first direction in the interior space. The shapes of the deformable members individually change with the rotation. The volumes of the accommodation chambers individually increase and decrease with change in shape of the deformable members.

20 Claims, 8 Drawing Sheets

(56) References Cited

U.S. PATENT DOCUMENTS

2015/0184903 A1* 7/2015 Mun ................. F25B 21/00
62/3.1
2016/0091227 A1* 3/2016 Leonard ............. F25B 21/00
62/3.1

FOREIGN PATENT DOCUMENTS

| JP | 2019032116 A | * | 2/2019 | | |
|----|--------------|---|--------|---|---|
| WO | WO-2015139711 A1 | * | 9/2015 | ............. | F25B 21/00 |
| WO | 2016/018451 A1 | | 2/2016 | | |

* cited by examiner

MAGNETIC HEAT PUMP AND MAGNETIC REFRIGERATION CYCLE APPARATUS

CROSS-REFERENCE TO RELATED APPLICATION

The present application is based on PCT filing PCT/JP2020/021212, filed May 28, 2020, the entire contents of which are incorporated herein by reference.

TECHNICAL FIELD

The present disclosure relates to a magnetic heat pump and a magnetic refrigeration cycle apparatus.

BACKGROUND ART

Magnetic refrigeration technology, is known as an environment-friendly refrigeration technology. Magnetic refrigeration technology utilizes a phenomenon (magnetocaloric effect) in which when a magnetic field is applied to a material called magnetocaloric material kept in an adiabatic state, the temperature of the magnetocaloric material increases, and when a magnetic field is removed, the temperature of the magnetocaloric material decreases.

Conventionally, active magnetic regenerative (AMR) magnetic refrigeration cycle apparatuses are known (for example, see WO2016/018451). An active magnetic regenerative (AMR) magnetic refrigeration cycle apparatus includes a magnetic heat pump in which heating and cooling of a heat transport medium is performed by a magnetocaloric effect caused by exposing a magnetocaloric material to a changing magnetic field, and a pump disposed outside the magnetic heat pump to feed the heat transport medium to the magnetic heat pump.

CITATION LIST

Patent Literature

PTL 1: WO2016/018451

SUMMARY OF INVENTION

Technical Problem

A main object of the present disclosure is to provide a magnetic heat pump that can save the power of a pump disposed outside the magnetic heat pump or can eliminate the need of the pump, and a magnetic refrigeration cycle apparatus.

Solution to Problem

A magnetic heat pump according to the present disclosure includes at least one magnetocaloric member, an impeller, at least one deformable member, a casing, an electric motor, and a magnetic field generator. The at least one magnetocaloric member is made of a magnetocaloric material. The impeller has a center axis and at least one accommodation chamber aligned in a circumferential direction with respect to the center axis and accommodating the at least one magnetocaloric member. The at least one deformable member faces the at least one accommodation chamber and has a shape individually changing. The casing has an interior space accommodating the at least one magnetocaloric member, the impeller, and the at least one deformable member and allowing a heat transport medium to circulate, a first inlet for the heat transport medium to flow into the interior space, and a first outlet spaced apart from the first inlet in the circumferential direction and for the heat transport medium to flow out of the interior space. The electric motor integrally rotates the impeller, the at least one magnetocaloric member, and the at least one deformable member in a first direction from the first inlet toward the first outlet in the circumferential direction. The magnetic field generator produces a magnetic field becoming stronger along the first direction, in a first region extending from the first inlet to the first outlet in the first direction in the interior space. The at least one accommodation chamber is open toward an outside in a radial direction with respect to the center axis. The shape of the at least one deformable member individually changes with the rotation. The at least one accommodation chamber has a volume individually increasing and decreasing with the change of the shape of the at least one deformable member. The volume when the at least one accommodation chamber is located in the first region is larger than the volume when the at least one accommodation chamber is located in a second region located backward of the first inlet in the first direction and the volume when the at least one accommodation chamber is located in a third region located forward of the first outlet in the first direction.

Advantageous Effects of Invention

The present disclosure provides a magnetic heat pump that can save the power of a pump disposed outside the magnetic heat pump or can eliminate the need of the pinup, and a magnetic refrigeration cycle apparatus.

BRIEF DESCRIPTION OF DRAWINGS

FIG. 6 is a block diagram illustrating a magnetic refrigeration cycle apparatus according to the second embodiment.

DESCRIPTION OF EMBODIMENTS

Figure 1:
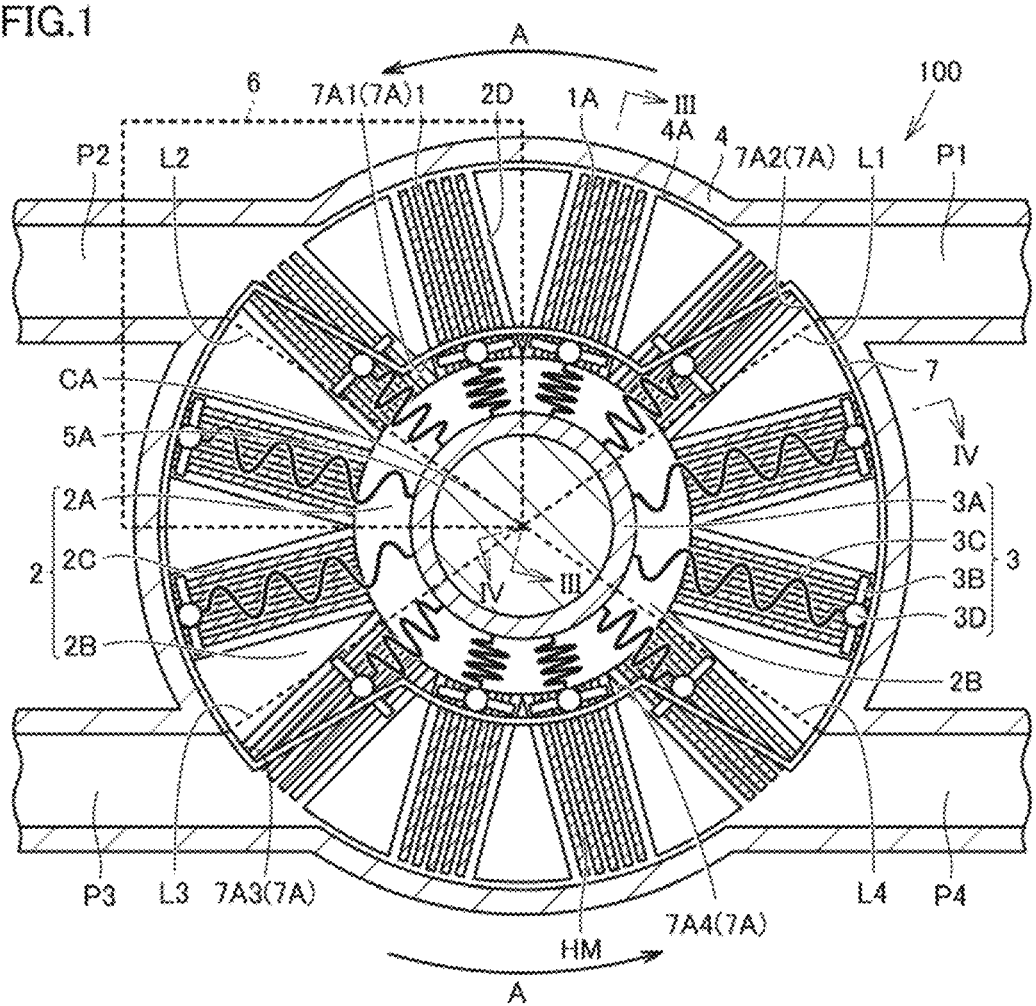
FIG. 1 is a cross-sectional view of a magnetic heat pump according to a first embodiment.

Embodiments of the present disclosure will be described below with reference to the drawings. In the following drawings, the same or corresponding parts are denoted by the same reference numerals and a description thereof will not be repeated.

First Embodiment

<Configuration of Magnetic Heat Pump>

Figure 2:
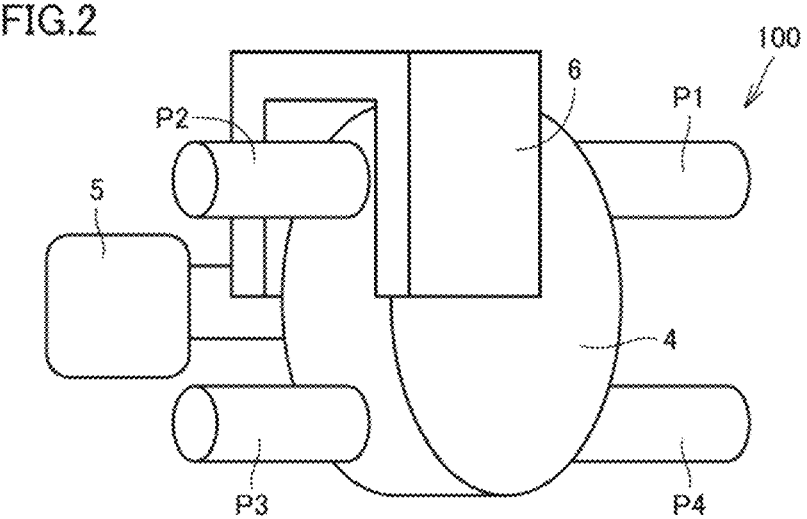
FIG. 2 is a perspective view of the magnetic heat pump according to the first embodiment.

As illustrated in FIG. 1 and FIG. 2, a magnetic heat pump 100 according to a first embodiment mainly includes a plurality of magnetocaloric members 1, an impeller 2, a plurality of deformable members 3, a casing 4, an electric motor 5, and a magnetic field generator 6.

Figure 3:
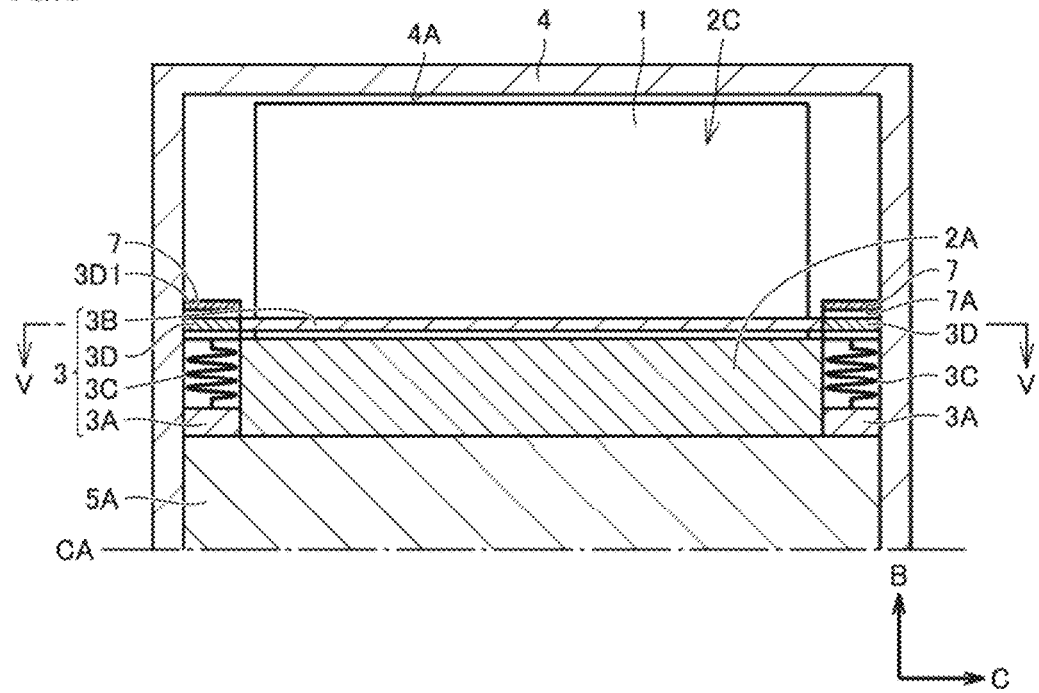
FIG. 3 is a partial cross-sectional view as viewed from arrow III-III in FIG. 1.
Figure 4:
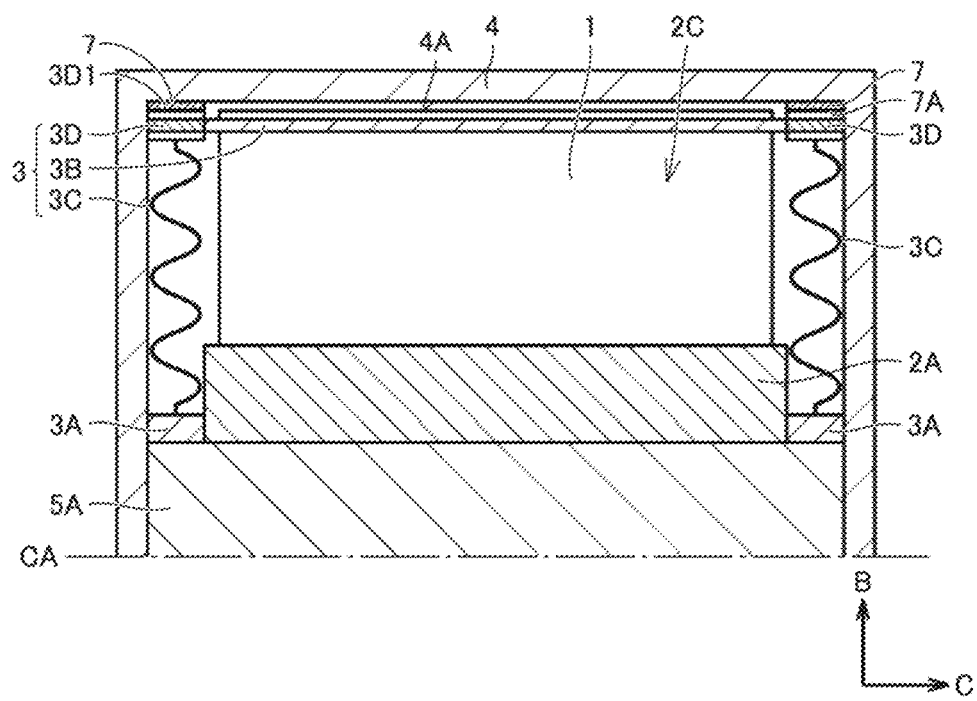
FIG. 4 is a partial cross-sectional view as viewed from arrow IV-IV in FIG. 1.

As illustrated in FIG. 1, FIG. 3, and FIG. 4, magnetocaloric members 1, impeller 2, deformable members 3, and a part of a shaft 5A of electric motor 5 are accommodated inside casing 4. As illustrated in FIG. 1 and FIG. 2, the remaining part of electric motor 5 and magnetic field generator 6 are disposed outside casing 4. Each of magnetocaloric members 1, impeller 2, and deformable members 3 is fixed to shaft 5A of electric motor 5. Electric motor 5 rotates each of magnetocaloric members 1, impeller 2, and deformable members 3 in one direction along a circumferential direction with respect to center axis CA (see FIG. 1). Hereinafter the one direction is called first direction A. The rotation speeds of magnetocaloric members 1, impeller 2, and deformable members 3 are equal to each other. With the rotation, a relative positional relation of magnetocaloric members 1, impeller 2, and deformable members 3 to casing 4 changes. FIG. 1 is a cross-sectional view illustrating one state in the change. In FIG. 1, the first direction A is counterclockwise.

The material forming each of magnetocaloric members 1 includes a magnetocaloric material. The magnetocaloric material is a material that brings about a magnetocaloric effect and includes, for example, gadolinium (Gd).

Each of magnetocaloric members 1 has, for example, at least one slit 1A. Slits 1A are aligned in the circumferential direction and extend along a radial direction B with respect to center axis CA thereinafter radial direction B) and an extending direction C of center axis CA (hereinafter extending direction C). In other words, each of magnetocaloric members 1 has a pair of surfaces Opposed to each other in the circumferential direction. The spacing in the circumferential direction between slits 1A is constant, for example, irrespective of the position in the radial direction B. In FIG. 1, magnetocaloric members 1 are hatched for convenience of explanation in order to clarify magnetocaloric members 1 and slits 1A.

Each of magnetocaloric members 1 has, for example, a plurality of slits 1A. Slits 1A are aligned in the circumferential direction and each extend along the radial direction B and the extending direction C. In other words, each of magnetocaloric members 1 has a plurality of pairs of surfaces opposed to each other in the circumferential direction. The number of slits 1A formed in one magnetocaloric member 1 is not limited and, for example, four.

The surface area of each of magnetocaloric members 1 is, for example, larger, than the surface area of each of a plurality of vanes 211 of impeller 2.

Impeller 2 has center axis CA. Impeller 2 includes a base 2A and a plurality of vanes 2B. Base 2A is fixed to shaft 5A of electric motor 5, Base 2A is formed in an annular shape and has an inner peripheral surface fitted on shaft 5A. A plurality of vanes 211 are aligned and spaced apart from each other in the circumferential direction.

Each of magnetocaloric members 1 is disposed between two vanes 2B adjacent to each other in the circumferential direction among a plurality of vanes 2B. In other words, impeller 2 has a plurality of accommodation chambers 2C aligned in the circumferential direction and each accommodating one of magnetocaloric members 1, Accommodation chambers 2C are disposed at regular intervals in the circumferential direction. The number of accommodation chambers 2C is not limited and, for example, 12.

The configurations of accommodation chambers 2 are, for example, equal to each other. Each of accommodation chambers 2C has a bottom surface facing the outside in the radial direction B, a side surface facing the front side in the first direction A, and a side surface facing the back side in the first direction A. The bottom surface of each of accommodation chambers 2C is formed with, for example, the outer peripheral surface of base 2A. An end portion located on the inside in the radial direction B of each magnetocaloric member 1 is fixed to the bottom surface of the corresponding one of accommodation chambers 2C. The side surface of each of accommodation chambers 2C, is formed with, for example, a side surface of a corresponding one of vanes 2B. The side surface of each of accommodation chambers 2C is, for example, spaced apart from the corresponding one of magnetocaloric members 1 in the circumferential direction.

Each of accommodation chambers 2C is open toward the outside in the radial direction B. The spacing in the circumferential direction between accommodation chambers 2 is constant, for example, irrespective of the position in the radial direction B. Base 2A and a plurality of vanes 28 are formed, for example, integrally.

Each of deformable members 3 fines accommodation chamber 2C. Each of deformable members 3 has its shape individually changing. Each of deformable members 3 includes a stationary part 3A, a movable part 3B, and a plurality of first elastic parts 3C.

Stationary part 3A does not move relative to magnetocaloric member 1 and is fixed. Stationary part 3A rotates together with a plurality of magnetocaloric members 1 and impeller 2 in the circumferential direction but does not move in the radial direction. Stationary part 3A is disposed, for example, outside each of accommodation chambers 2C. Stationary part 3A is fixed, for example, to shaft 5A.

Movable part 3B moves relative to magnetocaloric member 1 along the radial direction B. Movable part 3B rotates together with a plurality of magnetocaloric members 1 and impeller 2 in the circumferential direction and moves in the radial direction. Movable part 3B is disposed inside each of accommodation chambers 2C.

Figure 5:
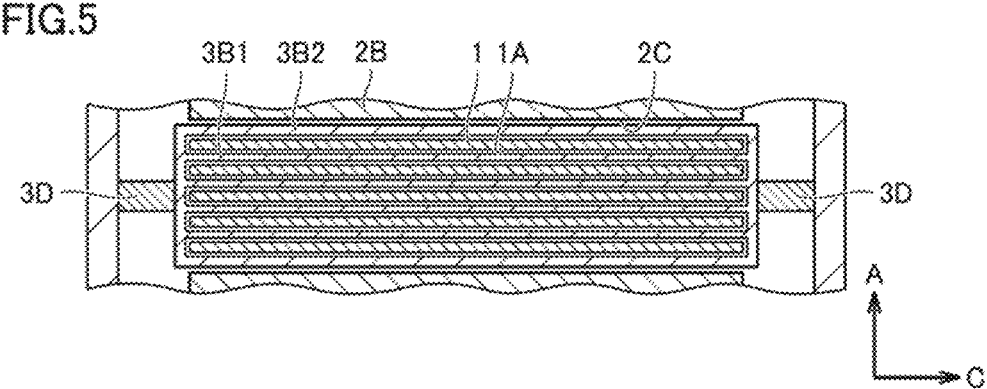
FIG. 5 is a partial cross-sectional view as viewed from arrow V-V in FIG. 3.

As illustrated in FIG. 5, in a cross section perpendicular to the extending direction C, movable part 3B has, for example, a lengthwise direction orthogonal to the radial direction B and a crosswise direction orthogonal to the lengthwise direction, Movable part 3B has a plurality of portions 3B1 inserted in slits 1A and a plurality of portions 3B2 disposed outside slits 1A. A plurality of portions 3B1 and a plurality of portions 3132 are connected to each other, for example, at both ends in the extending direction C. A plurality of portions 3B1 and a plurality of portions 3B2 may be connected to each other, for example, at one end in the extending direction. C. In other words, as viewed from the radial direction B, the outer shape of movable part 3B may be a comb-like shape.

A plurality of first elastic parts 3C rotate together with a plurality of magnetocaloric members 1 and impeller 2 in the circumferential direction and are elastically deformed in the radial direction B. A plurality of first elastic parts 3C are disposed to sandwich movable part 3B in the extending direction C. Each of deformable members 3 includes at least one first elastic part 3C.

Each first elastic part 3C has a first end portion located on the inside in the radial direction B and a second end portion located on the outside in the radial direction B. The first end portion is connected to stationary part 3A. The second end portion is connected to movable part 3B.

Stationary parts 3A of a plurality of deformable members 3 are thrilled integrally. Movable parts 3B of deformable members 3 move individually. First elastic parts 3C of deformable members 3 are elastically deformed individually.

Each of deformable members 3 further includes, for example, a plurality of connecting parts 3D connecting movable part 3B to the second end portion of first elastic part 3C. A plurality of connecting parts 3D are disposed to sandwich movable part 3B in the extending direction C.

Each, connecting part 3D can rotate relative to movable part 3B in the circumferential direction with respect to the axis passing through the center in the lengthwise direction and the crosswise direction of movable part 3B and extending along the extending direction C. In a cross section perpendicular to the extending direction. C, the shape of connecting part 3D is, for example, a circular shape. Connecting part 3D has, for example, a cylindrical shape. An outer peripheral surface 3D1 of connecting part 3D has a portion fixed to the second end portion of first elastic part 3C and a portion in contact with an inner peripheral surface of a guide member 7 described later.

Casing 4 has an interior space that accommodates a plurality of magnetocaloric members 1, impeller 2, a plurality of deformable members 3, and a part of shaft 5A of electric motor 5 and allows a heat transport medium to circulate. The interior space has, for example, a cylindrical shape. The heat transport medium is, for example, water or ethanol.

Further, casing 4 has a first inlet P1 for a heat transport medium to flow into the interior space and a first outlet P2 spaced apart from first inlet P1 in the circumferential direction and for a heat transport medium to flow out of the interior space. First outlet P2 is disposed on the front side in the first direction A relative to first inlet P1. First inlet P1 is, for example, opposed to first outlet P2 with the interior space interposed. First inlet P1 and first outlet P2 are disposed, for example, to sandwich only, a spatial portion located on the outside of shaft 5A, base 2A, and stationary part 3A in the radial direction B in the interior space.

Further, casing 4 has a second inlet P3 for a heat transport medium to flow into the interior space and a second outlet P4 spaced apart from second inlet P3 in the circumferential direction and for a heat transport medium to flow our of the interior space. Second outlet P4 is disposed on the front side in the first direction A relative to second inlet P3, Second inlet P3 is, for example, opposed to second outlet P4 with the interior space interposed. Second inlet P3 and second outlet. P4 are disposed, for example, to sandwich only a spatial portion located on the outside of shaft 5A, base 2A, and stationary part 3A in the radial direction Bin the interior space.

Second inlet P3 is disposed on the front side in the first direction A relative to first outlet P2. First inlet P1 is disposed on the front side in the first direction A relative to second outlet P4. That is, first inlet P1, first outlet P2, second inlet P3, and second outlet P4 are disposed in this order from the back side to the front side in the first direction A.

Casing 4 has a first inner peripheral surface 4A facing the interior space and facing the inside in the radial direction B. First inner peripheral surface $A has openings continuous to first inlet P1, first outlet P2, second inlet P3, and second outlet P4.

The interior space has a first region, a second region, a third region, and a fourth region. The first region, the second region, the third region, and the fourth region are continuous to each other.

The first region extends from first inlet P1 to first outlet P2 in the first direction A. In FIG. 1, the first region is a sector-shaped space located between a virtual line L1 connecting center axis CA and a portion located on the back side in the first direction A of the opening of first inlet P1 and a virtual line L2 connecting center axis CA and a portion located on the front side in the first direction A of the opening of first outlet P2.

The second region is located backward of first inlet P1 in the first direction A. The second region is a sector-shaped space located between the virtual line L1 and a virtual line L4 connecting center axis CA and a portion located on the front side in the first direction A of the opening of second outlet P4. The third region is located forward of first outlet P2 in the first direction A. The third region is a sector-shaped space located between the virtual line 12 and a virtual line L3 connecting center axis CA and a portion located on the back side in the first direction A of the opening of second inlet P3. The fourth region extends from second inlet P3 to second outlet P4 in the first direction A. The fourth region is a sector-shaped space located between the virtual line L3 and the virtual line L4. The virtual line L1 is disposed, for example, on the same straight line as the virtual line 13. The virtual line L2 is disposed, far example, on the same straight line as the virtual line 1A.

FIG. 3 is a partial cross-sectional view along the radial direction B of the first region. FIG. 4 is a partial cross-sectional view along the radial direction of the second region.

At least one accommodation chamber 2C of a plurality of accommodation chambers 2C is disposed in each of the first region, the second region, the third region, and the fourth region. In the state illustrated in FIG. 1, four accommodation chambers 2C are disposed in each of the first region and the fourth region, and two accommodation chambers 2C are disposed in each of the second region and the third region. In a state different from the state illustrated in, for example, three accommodation chambers 2C are disposed in each of the first region and the fourth region, and three accommodation chambers 2C are disposed in each of the second region and the third region.

The distance in the radial direction B between center axis CA and a portion facing each of the first region, the second region, the third region, and the fourth region in the first inner peripheral surface 4A is equal.

Electric motor 5 has shaft 5A and a drive that rotates shaft 5A in the first direction A. A part of shaft 5A is accommodated in the interior space of casing 4. The remaining part other than the above part of shaft 5A of electric motor 5 is disposed outside casing 4.

Magnetic field generator 6 is disposed outside casing 4. Magnetic field generator 6 produces a magnetic field becoming stronger along the first direction A in the first region. Magnetic field generator 6 produces a magnetic field becoming weaker along the first direction A in the third region. Magnetic field generator 6 produces, for example, a stronger magnetic, field in a region continuous to first outlet P2 in the first region than in a region continuous to first inlet P1 in the first region. The magnetic field in the first region is stronger along the first direction A. The magnetic field in the region continuous to first outlet P2 in the first region is stronger than the magnetic field in the region continuous to first inlet P1 in the first region. The magnetic field in the second region is constant along the first direction A. The magnetic field in the fourth region is constant along the first direction A. The magnetic field in the region continuous to second outlet P4 in the fourth region has a strength equivalent to that of the magnetic field in the region continuous to second inlet P3. The direction of each magnetic field is along the extending direction C.

Magnetic field generator 6 can have any configuration that can produce the strength distribution of magnetic fields as described above and includes, for example, at least one of permanent magnets, electromagnets, and superconducting magnets. Magnetic field generator 6 may further include a yoke to produce a strong magnetic field, Magnetic field generator 6 may include a Halbach array of permanent magnets in order to produce a strong magnetic field.

Magnetic heat pump 100 further includes guide member 7, Guide member 7 has a fixed position relative to easing 4. Guide member 7 guides movable part 3B that moves in the first direction A as deformable members 3 rotate in the first direction A, in the radial direction B.

As illustrated in FIG. 3 and FIG. 4, guide member 7 has a second inner peripheral surface 7A facing the inside in the radial direction B. Movable part 3B is pressed against second inner peripheral surface 7A of guide member 7 by first elastic pan 3C. Outer peripheral surface 3B1 of movable part 3B is in contact with second inner peripheral surface 7A. Second inner peripheral surface 7A is opposed to the outer peripheral surface of stationary part 3A in the radial direction B.

Second inner peripheral surface 7A of guide member 7 has a first surface portion 7A1 (first portion) disposed in the first region, a second surface portion 7A2 (second portion) disposed in the second region, a third surface portion 7A3 (third portion) disposed in the third region, and a fourth surface portion 7A4 disposed in the fourth region.

As illustrated in FIG. 1, in the first direction A, a part disposed on the front side of second surface portion 7A2 is disposed, for example, in a region located on the back side in the first region. A part located on the front side of second surface portion 7A2 in the first direction A faces, for example, first inlet P1. In the first direction A, a part disposed on the back side of third surface portion 7A3 is disposed in a region located on the front side in the first region. A part located on the back side of third surface portion 7A3 in the first direction A faces, for example, first outlet P2.

In the first direction A, a part disposed on the front side of third surface portion 7A3 is disposed in a region located on the back side in the fourth region. A part located on the front side of third surface portion 7A3 in the first direction A faces, for example, second inlet P3. In the first direction A, a part disposed on the back side of second surface portion 7A2 is disposed, for example, in a region located on the front side in the fourth region. A part located on the back side of second surface portion 7A2 in the first direction A faces, for example, second outlet P4.

In the radial direction B, first surface portion 7A1 and fourth surface portion 7A4 are disposed on the inside of the center of each magnetocaloric member 1. In the radial direction B, second surface portion 7A2 and third surface portion 7A3 are disposed on the inside of the center of each magnetocaloric member 1.

The distance in the radial direction B between first surface portion 7A 1 and first inner peripheral surface 4A is longer than the distance in the radial direction B between first surface portion 7A1 and the outer peripheral surface of base 2A. The distance in the radial direction B between second surface portion 7A2 and first inner peripheral surface 4A is shorter than the distance in the radial direction B between second surface portion 7A2 and the outer peripheral surface of base 2A. The distance in the radial direction 13 between third surface portion 7A3 and first inner peripheral surface 4A is shorter than the distance in the radial direction B between third surface portion 7A3 and the outer peripheral surface of base 2A. The distance in the radial direction B between fourth surface portion 7A4 and first inner peripheral surface 4A is longer than the distance in the radial direction B between fourth surface portion 7A4 and the outer peripheral surface of base 2A.

The distance in the radial direction B between first surface portion 7M and first inner peripheral surface 4A is longer than the distance in the radial direction B between second surface portion 7A2 and first inner peripheral surface 4A and the distance in the radial direction B between third surface portion 7A3 and first inner peripheral surface 4A. The distance in the radial direction B between first surface portion 7A1 of second inner peripheral surface 7A and center axis CA is shorter than the distance in the radial direction B between second surface portion 7A2 and center axis CA and the distance in the radial direction B between third surface portion 7A3 and center axis CA.

The distance in the radial direction B between fourth surface portion 7A4 and first inner peripheral surface 4A is longer than the distance in the radial direction. B between second surface portion 7A2 and first inner peripheral surface 4A and the distance in the radial direction B between third surface portion 7A3 and first inner peripheral surface 4A. The distance in the radial direction B between fourth surface portion 7A4 of second inner peripheral surface 7A and center axis CA is shorter than the distance in the radial direction B between second surface portion 7A2 and center axis CA and the distance in the radial direction B between third surface portion 7A3 and center axis CA.

The distance in the radial direction between first surface portion 7A1 and first inner peripheral surface 4A is, for example, equal to the distance in the radial direction between fourth surface portion 7A4 and first inner peripheral surface 4A. The distance in the radial direction B between second surface portion 7A2 and first inner peripheral surface 4A is, for example, equal to the distance in the radial direction B between third surface portion 7A3 and first inner peripheral surface 4A.

Second inner peripheral surface 7A of guide member 7 further has a fifth surface portion connecting second surface portion 7A2 and first surface portion 7A1, a sixth surface portion connecting, first surface portion 7A1 and third surface portion 7A3, a seventh surface portion connecting third surface portion 7A3 and fourth surface portion 7A4, and an eighth surface portion connecting fourth surface portion 7A4 and second surface portion 7A2.

The fifth surface portion is inclined from the outside toward the inside in the radial direction B as it approaches from the from side toward the back side in the first direction A. The sixth surface portion is inclined from the inside toward the outside in the radial direction B as it approaches from the front side toward the back side in the first direction. A. The seventh surface portion is inclined from the outside toward the inside in the radial direction B as it approaches from the front side toward the back side in the first direction A. The eighth surface portion is inclined from the inside toward the outside in the radial direction B as it approaches from the front side toward the back side in the first direction A.

The fifth Surface portion is disposed, for example in a region located on the back side in the first region in the first direction A. The sixth surface portion is disposed, for example, in a region located on the front side in the first region in the first direction A. The seventh surface portion is disposed, for example, in a region located on the hack side in the fourth region in the first direction A. The eighth surface portion is disposed, for example, in a region located on the front side in the fourth region in the first direction A.

The central angle formed by one end and the other end in the circumferential direction of each of the filth surface portion, the sixth surface portion, the seventh surface portion, and the eighth surface portion with respect to center axis CA is, for example, smaller than the central angle formed by one end and the other end in the circumferential direction of movable part 3B with respect to center axis CA.

The length in the radial direction B between the first end portion and the second end portion of first elastic part 3C located in the first region is shorter than the length in the radial direction B between the first end portion and the second end portion of first elastic part 3C located in the second region and the length in the radial direction B between the first end portion and the second end portion of first elastic part 3C located in the third region.

In magnetic heat pump 100 according to the first embodiment, the volume of each of accommodation chambers 2C is defined as the volume of the space located on the outside in the radial direction B of movable part 3B in each accommodation chamber 3C. The volume of each of accommodation chambers 2C changes depending on in which of the first region, the second region, the third region, and the fourth region each accommodation chamber 2C is located.

The volume when each of accommodation chambers 2C is located in the first region is larger than the volume when each of accommodation chambers 2C is located in the second region and the volume when it is located in the third region. The volume when each of accommodation chambers 2C is located in the fourth region is larger than the volume when each of accommodation chambers 2C is located in the second region and the volume when it is located in the third region. That is, the volume of each of accommodation chambers 2C increases and decreases with the rotation.

The volume when each of accommodation chambers 2C is located in the first region is, for example, equal to the volume when each of accommodation chambers 2C is located in the fourth region. The volume when each of accommodation chambers 2C is located in the second region is, for example, equal to the volume when each of accommodation chambers 2C is located in the third region.

<Operation of Magnetic Heat Pump>

In operation of magnetic heat pump 100, magnetocaloric members 1, impeller 2, and deformable members 3 rotate in the first direction A, so that the position of each of magnetocaloric members 1, impeller 2, and deformable members 3 relative to casing 4 and guide member 7 changes. Further, in operation of magnetic heat pump 100, magnetic field generator 6 produces the magnetic field described above.

When accommodation chamber 2C is located in the second region of casing 4, outer peripheral surface 3D1 of connecting part 3D is pressed by first elastic part 3C against second surface portion 7A2 of second inner peripheral surface 7A, so that movable part 3B is positioned on the outside of the center in the radial direction B of magnetocaloric member 1 in the accommodation chamber 2C. At this moment, the volume of accommodation chamber 2C is relatively small.

With the rotation, accommodation chamber 2C disposed in the second region moves to the first region. Outer peripheral surface 3D1 of connecting part 3D is guided by the fifth surface portion of second inner peripheral surface 7A to reach first surface portion 7A1. When outer peripheral surface 3D1 of connecting part 3D is guided to the fifth surface portion, the volume of accommodation chamber 2C gradually increases. That is, the volume of accommodation chamber 2C increases in a region facing first inlet P1 in the first region. Thus, a heat transport medium HM (see FIG. 1) flows into accommodation chamber 2C through first inlet P1.

When accommodation chamber 2C is disposed in the first region of casing 4, outer peripheral surface. 3D1 of connecting part 3D is pressed by first elastic part 3C against first surface portion 7A1, so that movable part 3B is positioned on the inside of the center in the radial direction. B of magnetocaloric member 1 in the accommodation chamber 2C. The volume of accommodation chamber 2C when outer peripheral surface 3D1 of connecting part 31) is pressed against first surface portion 7A1 is larger than the volume of accommodation chamber 2C when outer peripheral surface 301 of connecting part 3D is pressed against: second surface portion 7A2.

Heat transport medium HM flowing into accommodation chamber 2C is held in accommodation chamber 2C while outer peripheral surface 3D1 of connecting part 3D is pressed against first surface portion 7A1. In this state, accommodation chamber 2C moves along the first direction A through a region in which a magnetic field becomes stronger along the first direction A in the first region. Thus, magnetocaloric member 1 accommodated in accommodation chamber 2C produces heat, and heat transport medium HM held in accommodation chamber 2C is heated by magnetocaloric member 1.

With the rotation, accommodation chamber 2C disposed in the first region moves to the third region. Outer peripheral surface 3D1 of connecting part 31) is guided by the sixth surface portion of second inner peripheral surface 7A to reach third surface portion 7A3. When outer peripheral surface 3D1 of connecting part 3D is guided to the sixth surface portion, the volume of accommodation chamber 2C gradually decreases. That is, the volume of accommodation chamber 2C decreases in a region facing first outlet P2 in the first region. Thus, heat transport medium HM (see FIG. 1) heated as described above flows out to first outlet P2 from the inside of accommodation chamber 2C.

When accommodation chamber 2C is located in the third region of casing 4, outer peripheral surface 3D1 of connecting part 3D is pressed by first elastic part 3C against third surface portion 7A3, so that movable part 3B is positioned on the outside of the center in the radial direction B of magnetocaloric member 1 in the accommodation chamber 2C. The volume of accommodation chamber 2C when outer peripheral surface 3D1 of connecting part 3D is pressed against third sur ice portion 7A3 is smaller than the volume of accommodation chamber 2C when outer peripheral surface 3D1 of connecting part 3D is pressed against first surface portion 7A1.

Accommodation chamber 2C moves through the third region in the first direction A, so that magnetocaloric member 1 accommodated in accommodation chamber 2C moves along the first direction A through a region in which the magnetic field becomes weaker along the first direction A. Thus, magnetocaloric member 1 absorbs heat.

With the rotation, accommodation chamber 2C disposed in the third region moves to the fourth region. Outer peripheral surface 3D1 of connecting part 3D is guided by the seventh surface portion of second inner peripheral surface 7A to reach fourth surface portion 7A4. When outer peripheral surface 3D1 of connecting part 3D is guided to the seventh surface portion, the volume of accommodation chamber 2C gradually increases. That is, the volume of accommodation chamber 2C increases in a region facing second inlet P3 in the fourth region. Thus, heat transport medium HM (see FIG. 1) flows into accommodation chamber 2C through second inlet P3.

When accommodation chamber 2C is disposed in the first region of casing 4, outer peripheral surface 3D1 of connecting part 3D is pressed by first elastic part 3C against fourth surface portion 7A4, so that movable part 3B is positioned on the inside of the center in the radial direction B of magnetocaloric member 4 in the accommodation chamber 2C. The volume of accommodation chamber 2C when outer peripheral surface 3D1 of connecting part 3D is pressed against fourth surface portion 7A4 is larger than the volume of accommodation chamber 2C when outer peripheral surface 3D1 of connecting part 3D is pressed against third surface portion 7A3.

Heat transport medium HM flowing into accommodation chamber 2C is held in accommodation chamber 2C while outer peripheral surface 3D1 of connecting part 3D is pressed against fourth surface portion 7A4. In this state, since accommodation chamber 2C moves along the first direction A through a region in which the magnetic field becomes weaker along the first direction A, magnetocaloric member 1 accommodated in accommodation chamber 2C absorbs heat, and heat transport medium HM held in accommodation chamber 2C is cooled by magnetocaloric member 1.

With the rotation, accommodation chamber 2C disposed in the fourth region moves to the second region. Outer peripheral surface 3D1 of connecting part 3D is guided by the eighth surface portion of second inner peripheral surface 7A to reach second surface portion 7A2. When outer peripheral surface 3D1 of connecting part 3D is guided to the eighth surface portion, the volume of accommodation chamber 2C gradually decreases. That is, the volume of accommodation chamber 2C decreases in a region facing second outlet P4 in the fourth region. Thus, heat transport medium HM (see FIG. 1) cooled as described above flows out to second outlet P4 from the inside of accommodation chamber 2C.

As described above, when accommodation chamber 2C is disposed in the second region of casing 4, outer peripheral surface 301 of connecting part 3D is pressed by first elastic part 3C against second surface portion 7A2, so that movable part 38 is positioned on the outside of the center in the radial direction B of magnetocaloric member 1 in the accommodation chamber 2C. The volume of accommodation chamber 2C when outer peripheral surface 3D1 of connecting part 3D is pressed against second surface portion 7A2 is smaller than the volume of accommodation chamber 2C when outer peripheral surface 3D1 of connecting part 3D is pressed against fourth surface portion 7A4.

The cycle of the increasing and decreasing volume of accommodation chamber 2C is repeated while the rotation continues. Thus, magnetic heat pump 100 introduces the heat transport medium into the interior space through first inlet P1, heats the introduced heat transport medium, and discharges the heated heat transport medium to the outside through first outlet P2. At the same time, magnetic heat pump 100 introduces the heat transport medium into the interior space through second inlet P3, cools the introduced heat transport medium, and discharges the cooled heat transport medium to the outside through second outlet P4.

<Configuration and Operation of Magnetic Refrigeration Cycle Apparatus>

Figure 6:
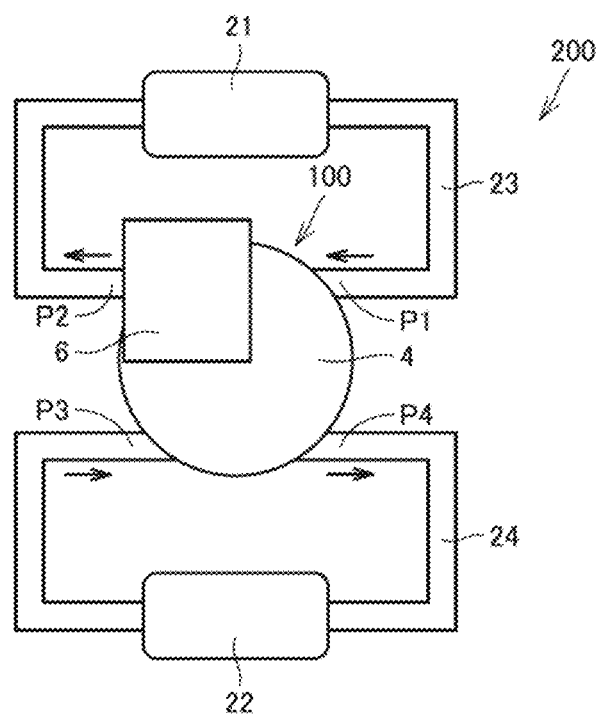
FIG. 6 is a block diagram illustrating a magnetic refrigeration cycle apparatus according to the first embodiment.

As illustrated in FIG. 6, a magnetic refrigeration cycle apparatus 200 according to the first embodiment mainly includes magnetic heat pump 100, a first channel 21, and a second channel 22. In magnetic refrigeration cycle apparatus 200, the interior of magnetic heat pump 100 first channel 21, and second channel 22 is filled with a heat transport medium.

First channel 21 has one end connected to first inlet P1 of magnetic heat pump 100 and the other end connected to first outlet P2 of magnetic heat pump 100. First channel 21 includes, for example, a first heat exchanger 23. The heat transport medium heated by magnetic heat pump 100 is discharged to first channel 21 through first outlet P2 by magnetic heat pump 100 and cooled by exchanging heat with another heat transport medium such as air in first heat exchanger 23. The heat transport medium cooled in first heat exchanger 23 is introduced into magnetic heat pump 100 from first channel 21 through first inlet P1.

Second channel 22 has one end connected to second inlet P3 of magnetic heat pump 100 and the other end connected to second outlet P4 of magnetic heat pump 100. Second channel 22 includes, for example, a second heat exchanger 24. The heat transport medium cooled by magnetic heat pump 100 is discharged to second channel 22 through second outlet P4 by magnetic heat pump 100 and heated by exchanging heat with another heat transport medium such as air in second exchanger 24. The heat transport medium heated in second heat exchanger 24 is introduced into magnetic heat pump 100 from second channel 22 through second inlet P3.

<Operation Effects>

Magnetic heat pump 100 includes a plurality of magnetocaloric members 1, impeller 2, a plurality of deformable members 3, casing 4, electric motor 5, and magnetic field generator 6. Each of magnetocaloric members 1 is made of a magnetocaloric material. Impeller 2 has center axis CA and a plurality of accommodation chambers 2C aligned in a circumferential direction with respect to the center axis and each accommodating a corresponding one of magnetocaloric members 1. Deformable members 3 face each of accommodation chambers 2C and have the shape individually changing. Casing 4 has an interior space accommodating magnetocaloric members 1, impeller 2, and deformable members 3 and allowing a heat transport medium to circulate, first inlet P1 for the heat transport medium to flow into the interior space, and first outlet P2 spaced apart from first inlet P1 in the circumferential direction and for the heat transport medium to flow out of the interior space.

Electric motor 5 rotates magnetocaloric members 1, impeller 2, and deformable members 3 integrally in the first direction A. Magnetic field generator 6 produces a magnetic field becoming stronger along the first direction A in the first region of the interior space.

Accommodation chambers 2C are open toward the outside in the radial direction 13. The shapes of deformable members 3 individually change with rotation. The volume of each of accommodation chambers 2C individually increases and decreases with change in shape of each of deformable members 3. The volume when each accommodation chamber 2C is located in the first region extending from first inlet P1 to first outlet P2 in the first direction A is larger than the volume when each accommodation chamber 2C is located in the second region located on the back side of first inlet P1 in the first direction A and the volume when each accommodation chamber 2C is located in the third region located on the front side of first outlet P2 in the first direction A.

In such a magnetic heat pump 100, the action as a pump for discharging the heat transport medium and the action of changing the strength of a magnetic field to which magnetocaloric member 1 is exposed to develop a magnetocaloric effect are simultaneously achieved by a driving force of a single electric motor 5.

Specifically, when each accommodation chamber 2C moves from the second region to the first region with the rotation, the volume of the accommodation chamber 2C increases. The heat transport medium therefore flows into the accommodation chamber 2C through first inlet P1.

Further, in magnetic heat pump 100, magnetocaloric member 1 in the first region produces heat, and heat transport medium HM held in accommodation chamber 2C is heated by magnetocaloric member 1.

Further, in magnetic heat pump 100, when each accommodation chamber 2C moves from the first region to the third region with the rotation, the volume of accommodation chamber 2C decreases. The heated heat transport medium therefore flows out of accommodation chamber 2C to first outlet P2.

As a result, magnetic heat pump 100 can heat the heat transport medium by the magnetocaloric effect and discharge the heated heat transport medium. Magnetic refrigeration cycle apparatus 200 including magnetic heat pump 100 therefore can save the power of a pump disposed outside the magnetic heat pump in a conventional magnetic refrigeration cycle apparatus or can eliminate the need of the pump.

In magnetic heat pump 100, each of deformable members 3 includes movable part 3B that moves relative to magnetocaloric member 1 in the radial direction B in the interior of each accommodation chamber 2C, Magnetic heat pump 100 has a fixed position relative to casing 4 and further includes guide member 7 that guides movable part 311 moving in the circumferential direction with the rotation in the radial direction B.

Casing 4 has first inner peripheral surface 4A facing the interior space and facing the inside in the radial direction B. The volume of each accommodation chamber 2C is the volume of a space located on the outside of movable part 3B in the radial direction B in the accommodation chamber 2C. The distance in the radial direction B between movable part 3B and first inner peripheral surface 4A when movable part 3B is located in the first region is longer than the distance in the radial direction B between movable part 3B and first inner peripheral surface 4A when movable part 3B is located in the second region or the third region.

In this configuration, each movable part 311 moves in the radial direction. B with the rotation to increase or decrease the volume of each accommodation chamber 2C as described above. The movement of each movable part 3B in the radial direction B achieved only by a driving force applied by electric motor 5 to each movable part 3B. Magnetic heat pump 100 therefore can be reduced in size compared with when movable part 3B is moved in the radial direction B by a driving force applied by a drive source other than electric motor 5.

In magnetic heat pump 100, each of deformable members 3 further includes stationary part 3A fixed relative to the corresponding magnetocaloric member 1, and first elastic part 3C having a first end portion connected to stationary part 3A and a second end portion connected to the movable part and located on the side opposite to the first end portion and elastically deformed in the radial direction. Guide member 7 has second inner peripheral surface 7A facing the inside in the radial direction B. Movable part 3B is pressed by first elastic part 3C against second inner peripheral surface 7A of guide member 7. Second inner peripheral surface 7A of the guide member has first surface portion 7A1 disposed in the first region, second surface portion 7A2 disposed in the second region, and third surface portion 7A3 disposed in the third region.

The distance in the radial direction B between first surface portion 7A1 and first inner peripheral surface 4A is longer than the distance in the radial direction B between second surface portion 7A2 and first inner peripheral surface 4A and the distance in the radial direction B between third surface portion 7A3 and first inner peripheral surface 4A.

With this configuration, since the position in the radial direction B of movable part 3B is defined by first elastic part 3C, increase and decrease of the volume with the rotation is performed more reliably.

In magnetic heat pump 100, each of magnetocaloric members 1 has at least one slit 1A extending along the extending direction C and the radial direction B. Each movable part 3B has a portion inserted in slit 1A.

The area of a heat transfer surface in contact with the heat transport medium in each magnetocaloric member 1 having at least one slit 1A is larger than the area of a heat transfer surface in contact with the heat transport medium in each magnetocaloric member 1 having no slit 1A. The area of the heat transfer surface increases as the number of slits 1A formed in each magnetocaloric member 1 increases. As the area of the heat transfer surface increases, heat is more easily transferred between each magnetocaloric member 1 and the heat transport medium.

In magnetic heat pump 100, easing 4 further has second inlet P3 for the heat transport medium to flow into the interior space and second outlet P4 spaced apart from second inlet P3 in the circumferential direction and for the heat transport medium to flow out of the interior space. Second inlet P3 is disposed on the front side of first outlet. P2 in the first direction A. Second outlet P4 is disposed on the front side of second inlet. P3 in the first direction A. Magnetic field generator 6 produces a stronger magnetic field in at least a part of the third region than in the fourth region. The volume when located in the fourth region extending from second inlet P3 to second outlet P4 in the first direction A is larger than the volume when each accommodation chamber 2C is located in the second region located on the back side of first inlet P1 in the first direction A and the volume when each accommodation chamber 2C is located in the third region located on the front side of first outlet P2 in the first direction A.

With this configuration, in magnetic heat pump 100, when each accommodation chamber 2C moves from the third region to the fourth region with the rotation, the volume of the accommodation chamber 2C increases. The heat transport medium therefore flows into the accommodation chamber 2C through second inlet P3.

Further, in magnetic heat pump 100, magnetocaloric member 1 in the fourth region absorbs heat, and heat transport medium HM held in accommodation chamber 2C is cooled by magnetocaloric member 1.

Further, in magnetic heat pump 100, when each accommodation chamber 2C moves from the fourth region to the second region with the rotation, the volume of the accommodation chamber 2C decreases. The cooled heat transport medium therefore flows out of the accommodation chamber 2C to second outlet P4.

As a result, magnetic heat pump 100 can heat the heat transport medium by the magnetocaloric effect and discharge the heated heat transport medium and can cool the heat transport medium by the magnetocaloric effect and discharge the cooled heat transport medium. Magnetic refrigeration cycle apparatus 200 including magnetic heat pump 100 therefore can save the power of a pump disposed outside the magnetic heat pump in a conventional magnetic refrigeration cycle apparatus or can eliminate the need of the pump.

Magnetic refrigeration cycle apparatus 200 includes magnetic heat pump 100, first channel 21, and second channel 22. First channel 21 has one end connected to first inlet P1 of magnetic heat pump 100 and the other end connected to first outlet P2 and allows the heat transport medium to flow. Second channel 22 has one end connected to second inlet P3 and the other end connected to second outlet P4 and allows the heat transport medium to flow. First channel 21 includes, for example, first heat exchanger 23. Second channel 22 includes, for example, second heat exchanger 24.

In magnetic refrigeration cycle apparatus 200, the heat transport medium heated by magnetic heat pump 100 is cooled by exchanging heat with another heat transport medium in first heat exchanger 23. The heat transport medium cooled in first heat exchanger 23 is introduced into magnetic heat pump 100. Further, the heat transport medium cooled by magnetic heat pump 100 is heated by exchanging heat with another heat transport medium in second heat exchanger 24. The heat transport medium heated in second heat exchanger 24 is introduced into magnetic heat pump 100. The refrigeration cycle described above is repeated while magnetic refrigeration cycle apparatus 200 is driven. Since magnetic heat pump 100 serves as a pump fir feeding the heat transport medium, magnetic refrigeration cycle apparatus 200 can save the power of a pump disposed outside the magnetic heat pump in a conventional magnetic refrigeration cycle apparatus or can eliminate the need of the pump.

Second Embodiment

Figure 7:
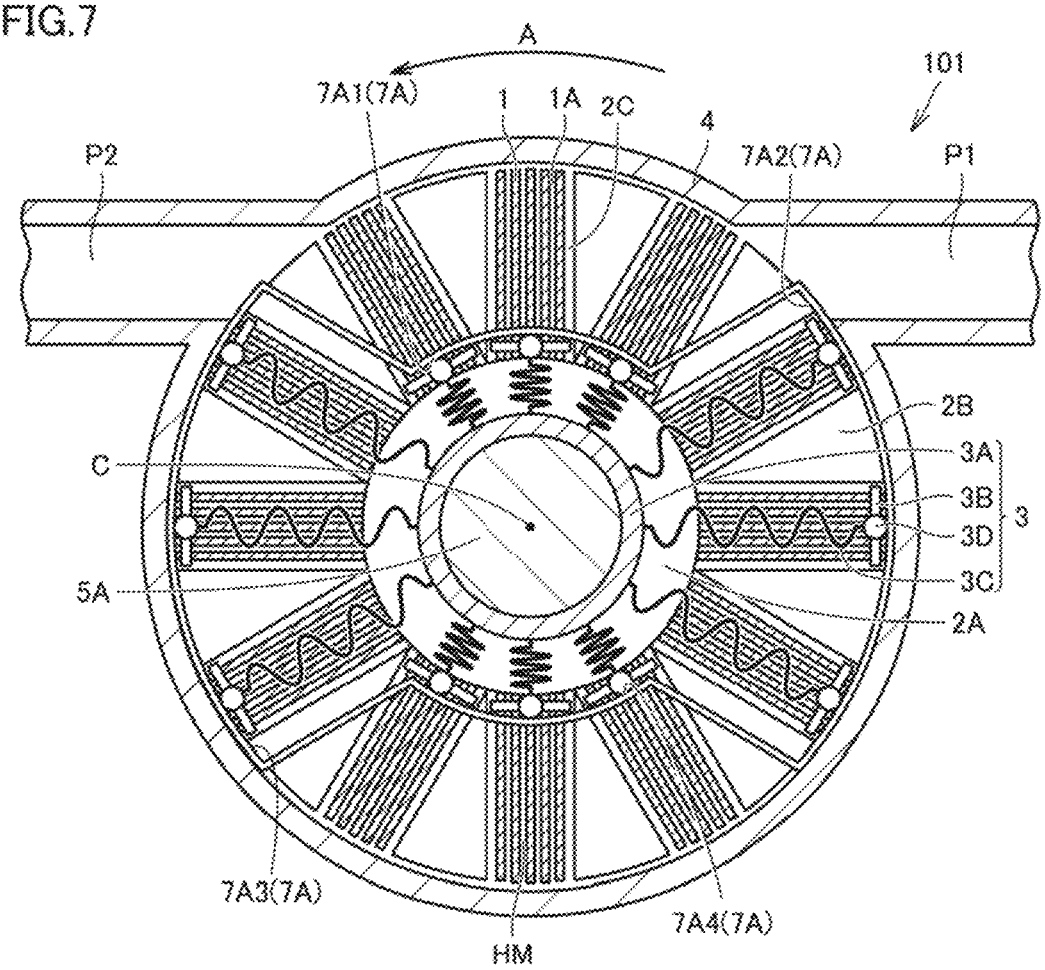
FIG. 7 is a cross-sectional view of a magnetic heat pump according to a second embodiment.

As illustrated in FIG. 7, a magnetic heat pump 101 according to a second embodiment basically has a configuration similar to magnetic heat pump 100 according to the first embodiment but differs from magnetic heat pump 100 in that casing 4 does not have second inlet P3 and second outlet P4.

Second inner peripheral surface 7A of guide member 7 at least has first surface portion 7A1, second surface portion 7A2, and third surface portion 7A3. Second inner peripheral surface 7A, for example, does not have fourth surface portion 7A4. In this case, second surface portion 7A2 and third surface portion 7A3 may be formed integrally.

Electric motor 5 rotates magnetocaloric members 1, impeller 2, and deformable members 3 in the first direction A. Magnetic field generator 6 includes at least one of permanent magnets, electromagnets, and superconducting magnets whose position relative to casing 4 is variable.

Figure 8:
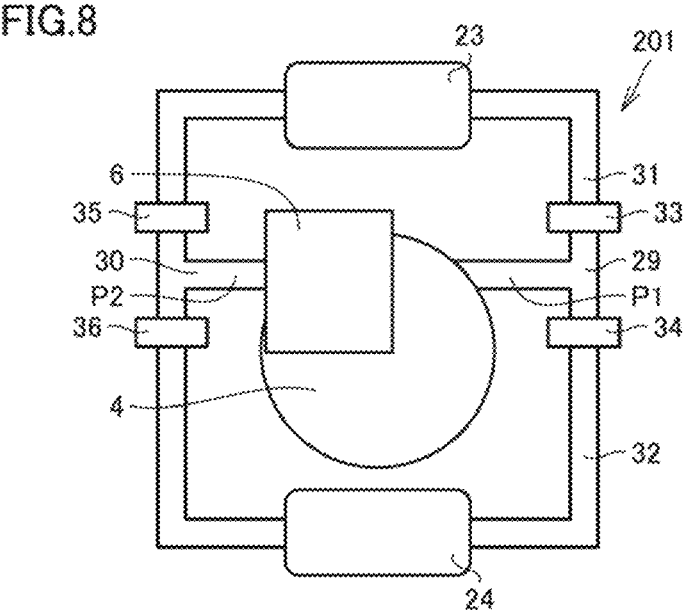

As illustrated in FIG. 8, magnetic refrigeration cycle apparatus 201 according to the second embodiment basically has a configuration similar to magnetic refrigeration cycle apparatus 200 according to the first embodiment but differs from magnetic refrigeration cycle apparatus 200 in that it includes a first channel 31 and a second channel 32, and a plurality of valves 33, 34, 35, and 36 as switches, instead of first channel 21 and second channel 22.

Each of first channel 31 and second channel 32 connects first inlet P1 and first outlet P2. First channel 31 and second channel 32 are connected to first inlet P1 and first outlet P2 in parallel with each other. First channel 31 includes first heat exchanger 23. Second channel 32 includes second heat exchanger 24.

Specifically, first inlet P1 is connected to a first opening of a branch line 29 having first to third openings. First outlet P2 is connected to a first opening of a branch line 30 having first to third openings. The second opening of branch line 29 is connected in series to the second opening of branch line 30 through first heat exchanger 23. The third opening of branch line 29 is connected to the third opening of branch line 30 through second heat exchanger 24.

A plurality of valves 33, 34, 35, and 36 switch between a first state in which magnetic heat pump 101 is connected to first channel 31 and not connected to second channel 32 and a second state in which the magnetic heat pump is connected to second channel 32 and not connected to first channel 31.

First channel 31 includes valve 33 and valve 34. Valve 33 is disposed between the second opening of branch line 29 and first heat exchanger 23 in first channel 31. Valve 34 is disposed between the second opening of branch line 30 and first heat exchanger 23 in first channel 31. Valve 33 and valve 34 are simultaneously opened or closed.

Second channel 32 includes valve 35 and valve 36. Valve 35 is disposed between the third opening of branch line 29 and second heat exchanger 24 in second channel 32. Valve 36 is disposed between the third opening of branch line 30 and second heat exchanger 24 in second channel 32. Valve 35 and valve 36 are simultaneously opened or closed. Valve 33 and valve 34, and valve 35 and valve 36 are alternately opened or closed. That is, a state in which valve 33 and valve 34 are opened and valve 35 and valve 36 are closed and a state in which valve 33 and valve 34 are closed and valve 35 and valve 36 are opened are alternately switched.

Magnetic heat pump 101 of in refrigeration cycle apparatus 201 is driven in the same manner as magnetic heat pump 100 of magnetic refrigeration cycle apparatus 200.

In a state in which valve 33 and valve 34 are opened and valve 35 and valve 36 are closed, magnetic field generator 6 forms a magnetic field gradually stronger along first direction A in the first region, so that the heat transport medium heated in magnetic heat pump 101 is supplied to first heat exchanger 23.

Subsequently, a state in which valve 33 and valve 34 are closed and valve 33 and valve 36 are opened is brought about. In this state, magnetic field generator 6 forms a magnetic field gradually weaker along first direction A in the first region, so that the heat transport medium cooled in magnetic heat pump 101 is supplied to second heat exchanger 24.

Electric motor 5 may alternately switch between a state in which magnetocaloric member 1, impeller 2, and deformable member 3 are rotated in the first direction A and a state in which magnetocaloric members 1, impeller 2 and deformable members 3 are rotated in a direction opposite to the first direction A. The switching is performed when the number of rotations in each state is at least one or more. Magnetic field generator 6 in this case need to form only a magnetic field becoming stronger along first direction A in the first region. Magnetic field generator 6 may include a permanent magnet having a fixed position relative to casing 4. In this ease, in a state in which magnetocaloric members 1, impeller 2, and deformable members 3 are rotated in a direction opposite to first direction A, first outlet P2 functions as an inlet through which the heat transport medium flows in, and first inlet P1 functions as an outlet through which the heat transport medium flows out.

Third Embodiment

Figure 9:
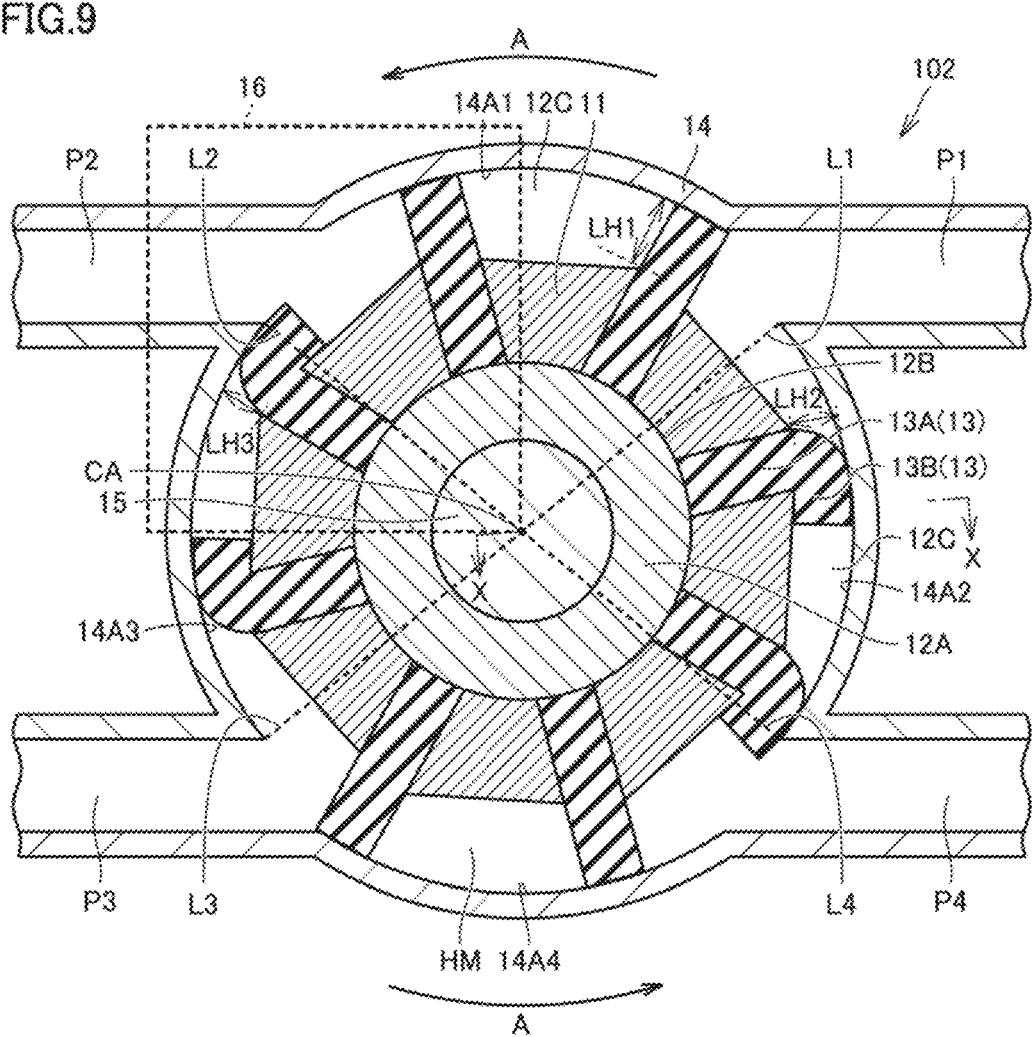
FIG. 9 is a cross-sectional view of a magnetic heat primp according to a third embodiment.
Figure 10:
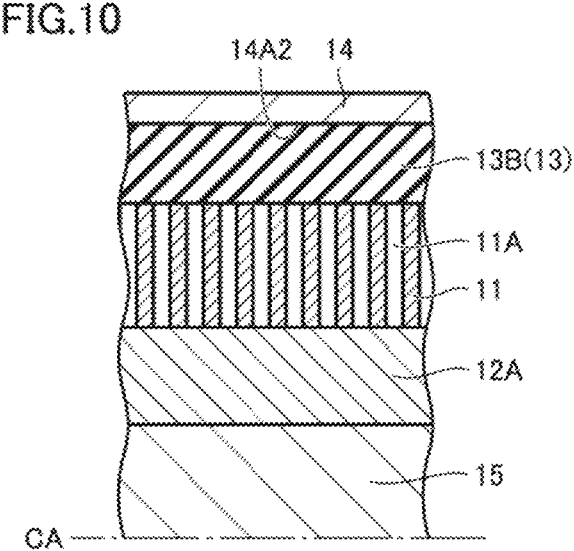
FIG. 10 is a partial cross-sectional view as viewed from arrow X-X in FIG. 9.

As illustrated in FIG. 9 and FIG. 10, a magnetic heat pump 102 according to a third embodiment basically has a configuration similar to magnetic heat pump 100 according to the first embodiment but differs from magnetic heat pump 100 in that it includes a plurality of deformable members 13 dividing accommodation chambers 2C instead of deformable members 3.

As illustrated in FIG. 9, magnetic heat pump 101 mainly includes a plurality of magnetocaloric members 11, an impeller 12, a plurality of deformable members 13, a casing 14, an electric motor 15, and a magnetic field generator 16. Each of magnetocaloric members 11, impeller 12, deformable members 13, casing 14, electric motor 15, and magnetic field generator 16 basically has a configuration similar to a corresponding one of magnetocaloric members 1, impeller 2, deformable members 3, casing 4, electric motor 5, and magnetic field generator 6 of magnetic heat pump 100.

As illustrated in FIG. 10, each of magnetocaloric members 11 has, for example, at least one slit 11A. Slits 11A are, for example, aligned in the extending direction C and extend along the radial direction B and the circumferential direction. In other words, each of magnetocaloric members 11 has a pair of surfaces opposed to each other in the extending direction C. The spacing in the extending direction C between slits 1A is constant, for example, irrespective of the position in the radial direction B. Slits 11A may be configured in the same manner as slits 1A.

Each of magnetocaloric members 11 has, for example, a plurality of slits 11A. Slits 11A are, for example, aligned in the extending direction C and each extend along the radial direction B and the circumferential direction. In other words, each of magnetocaloric members 11 has a plurality of pairs of surfaces opposed to each other in the extending direction C. Any number of slits 11A may be formed in one magnetocaloric member 1.

Impeller 12 has a central part 12A and a plurality of accommodation chambers 12C each accommodating one of magnetocaloric members 11. Accommodation chambers 12C are divided by each of deformable members 13. In other words, each of deformable members 13 is formed as a vane of impeller 12.

The configurations of accommodation chambers 12C are, for example, equal to each other. Each of accommodation chambers 12C has a bottom surface facing the outside in the radial direction 13, a side surface facing the front side in the first direction A, and a side surface facing the back side in the first direction A. The bottom surface of each of accommodation chambers 12C is formed with, for example, outer peripheral surface 12B of central pan 12A. An end portion located on the inside in the radial direction B of each magnetocaloric member 11 is fixed to the bottom surface of the corresponding one of accommodation chambers 12C. The side surface of each of accommodation chambers 12C is thrilled with a side surface of a corresponding one of deformable members 13. The side surface of each of accommodation chambers 12C is, for example, in contact with a corresponding one magnetocaloric members 11 in the circumferential direction.

Each of accommodation chambers 12C is open toward the outside in the radial direction B, The spacing in the circumferential direction between accommodation chambers 12C is, for example, gradually wider from the inside toward the outside in the radial direction B.

Deformable members 13 each include an inner peripheral portion 13A disposed on the inside in the radial direction B and an outer peripheral portion 13B disposed on the outside of inner peripheral portion 13A in the radial direction Band elastically deformed relative to inner peripheral portion 13A.

Inner peripheral portion 13A of each of deformable members 13 is disposed between two magnetocaloric members 11 adjacent to each other in the circumferential direction. Each inner peripheral portion 13A is, for example, in contact with two magnetocaloric members 11 adjacent to each other in the circumferential direction. Outer peripheral portion 13B of each of deformable members 13 is connected to inner peripheral portion 13A. Each outer peripheral portion 13B is disposed on the outside of the corresponding magnetocaloric member 11 in the radial direction B.

In a state in which no external force is applied to each deformable member 13 as viewed from the extending direction C, each deformable member 13 has, for example, a lengthwise direction along the radial direction and a crosswise direction along the circumferential direction.

Casing 14 has a first inner peripheral surface 14A facing the interior space and facing the inside in the radial direction 13. In magnetic heat pump 102, first inner peripheral surface 14A of casing 14 plays the same role as second inner peripheral surface 7A of guide member 7 in magnetic heat pump 100.

First inner peripheral surface 14A of casing 14 has a ninth surface portion 14A1 (fourth portion) disposed in the first region, a tenth surface portion 14A2 (fifth portion) disposed in the second region, an eleventh surface portion 14A3 (sixth portion) disposed in the third region, and a twelfth surface portion 14A4 disposed in the fourth region.

The distance in the radial direction B between ninth surface portion 14A1 and inner peripheral portion 13A is longer than the distance in the radial direction B between tenth surface portion 14A2 and inner peripheral portion 13A and the distance in the radial direction B between eleventh surface portion 14A3 and inner peripheral portion 13A, The distance in the radial direction B between twelfth surface portion 14A4 and inner peripheral portion 13A is longer than the distance in the radial direction 13 between tenth surface portion 14A2 and inner peripheral portion 13A and the distance in the radial direction B between eleventh surface portion 14A3 and inner peripheral portion 13A.

The distance in the radial direction B between ninth surface portion 14A1 and inner peripheral portion 13A is, for example, equal to the distance in the radial direction B between twelfth surface portion 14A4 and inner peripheral portion 13A. The distance in the radial direction B between tenth surface portion 14A2 and inner peripheral portion 13A is, for example, equal to the distance in the radial direction B between eleventh surface portion 14A3 and inner peripheral portion 13A.

Distance LH1 in the radial direction B between ninth surface portion 14A1 and magnetocaloric member 11 is longer than distance LH2 in the radial direction B between tenth surface portion 14A2 and magnetocaloric member 11 and distance LID in the radial direction B between eleventh surface portion 14A3 and magnetocaloric member 11. The distance in the radial direction B between twelfth surface portion 14A4 and magnetocaloric member 11 is longer than the distance in the radial direction B between tenth surface portion 14A2 and magnetocaloric member 11 and the distance in the radial direction B between eleventh surface portion 14A3 and magnetocaloric member 11.

The distance in the radial direction B between ninth surface portion 14A1 and magnetocaloric member 11 is, for example, equal to the distance in the radial direction B between twelfth snake portion 14A4 and magnetocaloric member 11. The distance in the radial direction B between tenth surface portion 14A2 and magnetocaloric member 11 is, for example, equal to the distance in the radial direction B between eleventh surface portion 14A3 and magnetocaloric member 11.

Outer peripheral portion 13B of each of deformable members 13 is provided in contact with at least each of tenth surface portion 14A2 and eleventh surface portion 14A3. For example, in a state in which no external force is applied to each deformable member 13, the surface of outer peripheral portion 13B that faces the front side in the first direction A is in contact with each of tenth surface portion 14A2 and eleventh surface portion 14A3. Thus, each accommodation chamber 12C located in the second region and the third region is hermetically sealed by impeller 12, deformable members 13, and casing 14.

Preferably, outer peripheral portion 13B of each of deformable members 13 is provided also in contact with each of ninth surface portion 14A1 and twelfth surface portion 14A4. For example, in a state in which no external force is applied to each deformable member 13, the surface of outer peripheral portion 13B that faces the outside in the radial direction B is in contact with each of ninth surface portion 14A1 and twelfth surface portion 14A4. Thus, each of accommodation chambers 12C is hermetically sealed by impeller 12, deformable members 13, and casing 14.

The length in the radial direction B of outer peripheral portion 13B when each of deformable members 13 is located in the first region is longer than the length in the radial direction B of outer peripheral portion 13B when the deformable member 13 is located in the second region and the length in the radial direction B of outer peripheral portion 13B when the deformable member 13 is located in the third region.

When each of deformable members 13 is located in the second region and the third region, outer peripheral portion 13B of each deformable member 3 is flexed relative to inner peripheral portion 13A. When each of deformable members 13 is located in the first region and the fourth region, outer peripheral portion 13B of each deformable member 3 is not flexed, for example, relative to inner peripheral portion 13A. When each of deformable members 13 is located in the first region and the fourth region, outer peripheral portion 13B of each deformable member 3 may be flexed, for example, relative to inner peripheral portion 13A.

As viewed from the extending direction C, the angle formed between inner peripheral portion 13A and outer peripheral portion 13B of each deformable member 13 is called a flex angle of the deformable member 13, The flex angle of each deformable member 13 disposed in the first region is greater than the flex angle of each deformable member 13 disposed in the second region and the flex angle of each deformable member 13 disposed in the third region. The flex angle of each deformable member 13 disposed in the first region is, for example, 150 degrees to ISO degrees. The flex angle of each deformable member 13 disposed in the second region and the flex angle of each deformable member 13 disposed in the third region is, for example, 80 degrees to 110 degrees.

Each of accommodation chambers 12C is defined as a space located between two deformable members 13 adjacent to each other in the circumferential direction and located on the inside of first inner peripheral surface 14A of casing 14 in the radial direction B. The volume of each of accommodation chambers 12C changes depending on in which of the first region, the second region, the third region, and the fourth region each accommodation chamber 12C is located.

The volume when each of accommodation chambers 12C is located in the first region is larger than the volume when each of accommodation chambers 12C is located in the second region and the volume when it is located in the third region. The volume when each of accommodation chambers 12C is located in the fourth region is larger than the volume when each of accommodation chambers 12C is located in the second region and the volume when it is located in the third region. That is, the volume of each of accommodation chambers 12C increases and decreases with the rotation.

The volume when each of accommodation chambers 12C is located in the first region is, for example, equal to the volume when each of accommodation chambers 12C is located in the fourth region. The volume when each of accommodation chambers 12C is located in the second region is, for example, equal to the volume when each of accommodation chambers 12C is located in the third region.

<Operation of Magnetic Heat Pump>

The operation of magnetic heat pump 102 is basically the same as the operation of magnetic heat pump 100. In operation of magnetic heat pomp 102, magnetocaloric members 11, impeller 12, and deformable members 13 rotate in the first direction A, so that the position of each of magnetocaloric members 11, impeller 12, and deformable members 13 relative to casing 14 changes. Further, in operation of magnetic heat pump 102, magnetic field generator 16 produces the magnetic field described above.

When accommodation chamber 12C is located in the second region of casing 14, outer peripheral portion 13B of deformable member 13 facing the accommodation chamber 12C comes into contact With tenth surface portion 14A2 of first inner peripheral surface 14A of casing 14 and undergoes external force to be bent relative to inner peripheral portion 13A. The volume of accommodation chamber 12C when outer peripheral portion 13B is in contact with tenth surface portion 14A2 is relatively small.

With the rotation, accommodation chamber 12C disposed in the second region moves to the first region. When outer peripheral portion 13B disposed on the front side in the first direction A relative to accommodation chamber 12C reaches a region facing first inlet P1 in the first region, the outer peripheral portion 13B is no longer in contact with tenth surface portion 14A2, and the external force applied, to the outer peripheral portion 13B in the second region is removed. This eliminates a state in which outer peripheral portion 13B is elastically deformed and bent relative to inner peripheral portion 13A.

Thus, the volume of accommodation chamber 12C when outer peripheral portion 13B disposed on the front side in the first direction A relative to accommodation chamber 12C is disposed in a region facing first inlet P1 in the first region is larger than the volume of accommodation chamber 12C when the outer peripheral portion 13B is in contact with tenth surface portion 14A2. That is, the volume of accommodation chamber 12C increases in a region facing first inlet P1 in the first region. Further, since accommodation chamber 12C disposed in the second region is hermetically sealed, a negative pressure is built up in accommodation chamber 12C with increase of the volume. As a result, heat transport medium HM (see FIG. 9) flows into accommodation chamber 12C through first inlet P1.

Subsequently, outer peripheral portion 13B disposed on the front side in the first direction A relative to accommodation chamber 12C comes into contact with ninth surface portion 14A1. The volume of accommodation chamber 12C when the outer peripheral portion 13B is in contact with ninth surface portion 14A1 is larger than the volume of accommodation chamber 12C when two outer peripheral portions 13B disposed to sandwich accommodation chamber 12C are in contact with tenth surface portion 14A2.

Heat transport medium HM flowing into accommodation chamber 12C is held in accommodation chamber 12C while outer peripheral portion 13B is in contact with ninth surface portion 14A1. In this state, accommodation chamber 12C moves along the first direction A through a region in which a magnetic field becomes stronger along the first direction A in the first region. Thus, magnetocaloric member 11 accommodated in accommodation chamber 12C produces heat, and heat transport medium held in accommodation chamber 12C is heated by magnetocaloric member 11.

With the rotation, accommodation chamber 12C disposed in the first region moves to the third region. When outer peripheral portion 13B of deformable member 13 disposed on the front side in the first direction A relative to accommodation chamber 12C reaches the third region, outer peripheral portion 13B comes into contact with eleventh surface portion 14A3 and is bent again relative to inner peripheral portion 13A.

Thus, the volume of accommodation chamber 12C when outer peripheral portion 13B disposed on the front side in the first direction A relative to accommodation chamber 12C is in contact with eleventh surface portion 14A3 is smaller than the volume of accommodation chamber 12C when the outer peripheral portion 13B is in contact with ninth surface portion 14A1. That is, the volume of accommodation chamber 12C decreases in a region facing first outlet P2 in the first region. Further, since accommodation chamber 12C disposed in the first region is hermetically sealed, a positive pressure is built up in accommodation chamber 12C with decrease of the volume. As a result, heat transport medium HM (see FIG. 8) flows out to first outlet P2 from the inside of accommodation chamber 12C.

Accommodation chamber 12C moves through the third region in the first direction A, so that magnetocaloric member 11 accommodated in the accommodation chamber 12C moves along the first direction A through a region in which the magnetic field becomes weaker along the first direction A. Thus, magnetocaloric member 11 absorbs heat.

With the rotation, accommodation chamber 12C disposed in the third region moves to the fourth region. When outer peripheral portion 13B disposed on the front side in the first direction A relative to accommodation chamber 12C reaches a region facing second inlet P3 in the fourth region, the outer peripheral portion 13B is no longer in contact with eleventh surface portion 14A3, and the external force applied to the outer peripheral portion 13B in the third region is removed. This eliminates a state in which outer peripheral portion 13B is elastically deformed and bent relative to inner peripheral portion 13A.

Thus, the volume of accommodation chamber 12C when outer peripheral portion 13B disposed on the front side in the first direction A relative to accommodation chamber 12C is disposed in a region facing second inlet P3 in the fourth region is larger than the volume of accommodation chamber 12C when the outer peripheral portion 13B is in contact with eleventh surface portion 14A3. That is, the volume of accommodation chamber 12C increases in a region facing second inlet P3 in the fourth region. Further, since accommodation chamber 12C disposed in the third region is hermetically sealed, a negative pressure is built up in accommodation chamber 12C with increase of the volume. As a result, heat transport medium HM (see FIG. 8) flows into accommodation chamber 12C through second inlet P3.

Subsequently, outer peripheral portion 13B disposed on the front side in the first direction A relative to accommodation chamber 12C comes into contact with twelfth surface portion 14A4. The volume of accommodation chamber 12C when the outer peripheral portion 13B is in contact with twelfth surface portion 14A4 is larger than the volume of accommodation chamber 12C when two outer peripheral portions 13B disposed to sandwich accommodation chamber 12C are in contact with eleventh surface portion 14A3.

Heat, transport medium HM flowing into accommodation chamber 12C is held in accommodation chamber 12C while outer peripheral portion 13B is in contact with twelfth surface portion 14A4, in this state, since accommodation chamber 12C moves along, the first direction A through a region in which the magnetic field becomes weaker along the first direction A, magnetocaloric member 11 accommodated in accommodation chamber 12C absorbs heat, and heat transport medium HM held in accommodation chamber 12C is cooled by magnetocaloric member 11.

With the rotation, accommodation chamber 12C disposed in the fourth region moves to the second region. When outer peripheral portion 13B of deformable member 13 disposed on the front side in the first direction A relative to accommodation chamber 12C reaches the second region, outer peripheral portion 13B comes into contact with tenth surface portion 14A2 and is bent again relative to inner peripheral portion 13A.

Thus, the volume of accommodation chamber 12C when outer peripheral portion 13B disposed on the front side in the first direction A relative to accommodation chamber 12C is in contact with tenth surface portion 14A2 is smaller than the volume of accommodation chamber 12C when the outer peripheral portion 13B is in contact with twelfth surface portion 14A4. That is, the volume of accommodation chamber 12C decreases in a region facing second outlet P4 in the fourth region. Further, since accommodation chamber 12C disposed in the fourth region is hermetically sealed, a positive pressure is built up in accommodation chamber 12C with decrease of the volume. As a result, heat transport medium HM (see FIG. 8) flows out to second outlet. P4 from the inside of accommodation chamber 12C.

The cycle of the increasing and decreasing volume of accommodation chamber 12C is repeated while the rotation continues. Thus, magnetic heat pump 102 introduces the heat transport medium into the interior space through first inlet P1, heats the introduced heat transport medium, and discharges the heated heat transport medium to the outside through first outlet P2. At the same time, magnetic heat pump 102 introduces the heat transport medium into the interior space through second inlet P3, cools the introduced heat transport medium, and discharges the cooled heat transport medium to the outside through second outlet P4.

A magnetic refrigeration cycle apparatus including magnetic heat pump 102 has a configuration similar to magnetic refrigeration cycle apparatus 200 including magnetic heat pump 100.

<Operation Effects>

Magnetic heat pump 102 basically has a configuration similar to magnetic heat pump 100 and achieve effects similar to those of magnetic heat pump 100, Further, in magnetic heat pump 102, deformable members 13 achieve an effect similar to that of each of vanes 2B and deformable members 3 in magnetic heat pump 100, and casing 14 achieves an effect similar to that of guide member 7 in magnetic heat pump 100. The number of components of magnetic heat pump 102 therefore can be reduced compared with the number of components or magnetic heat pump 100.

In magnetic heat pump 102, similar to magnetic heat pump 101, second inlet P3 and second outlet P4 need not be formed in easing 4, In this case, the magnetic refrigeration cycle apparatus including magnetic heat pump 102 may have a configuration similar to magnetic refrigeration cycle apparatus 201 including magnetic heat pump 101.

Fourth Embodiment

Figure 11:
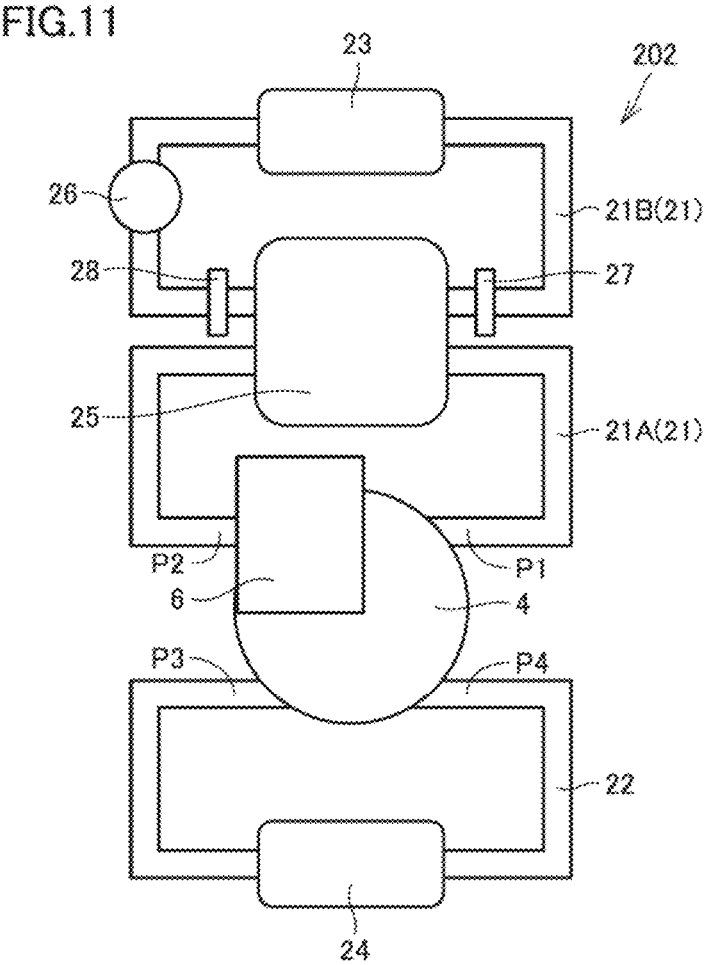
FIG. 11 is a block diagram illustrating a magnetic refrigeration cycle apparatus according to a fourth embodiment.

As illustrated in FIG. 11, a magnetic refrigeration cycle apparatus 202 according to a fourth embodiment basically has a configuration similar to magnetic refrigeration cycle apparatus 200 according to the first embodiment but differs from magnetic refrigeration cycle apparatus 200 in that first channel 21 further includes a thermal storage tank 25.

Thermal storage tank 25 is configured to store thermal energy of a heat transport medium. Thermal storage tank 25 has, for example, a reservoir for storing a heat transport medium, a heat insulator disposed around the reservoir to thermally insulate the reservoir, and four inlets/outlets for the heat transport medium to flow into the reservoir or flow out of the reservoir.

First channel 21 includes fast heat exchanger 23, thermal storage tank 25, a first line 21A, a second line 21B, a pump 26, a first valve 27, and a second valve 28.

First line 21A connects first inlet P1 and first outlet P2 of magnetic heat pump 100 to two inlets/outlets of thermal storage tank 25. Second line 21B connects the other two inlets/outlets of thermal storage tank 25 to first heat exchanger 23.

Pump 26 feeds the heat transport medium from thermal storage tank 25 to first heat exchanger 23 in second fine 21B.

First valve 27 is disposed between thermal storage tank 25 and first heat exchanger 23 in second line 21B to open or close a flow of the heat transport medium between thermal storage tank 25 and first heat exchanger 23.

Second valve 28 is disposed on the side opposite to first valve 27 with respect to thermal storage tank 25 in second line 21B. Second valve 28 is disposed between thermal storage tank 25 and pump 26 in second line 21B to open or close a flow of the heat transport medium between thermal storage tank 25 and first heat exchanger 23. First valve 27 and second valve 28 are, for example, opened or closed simultaneously with each other.

In magnetic refrigeration cycle apparatus 202, the interior of magnetic heat pump 100, first channel 21, and second channel 22 is filled with a heat transport medium.

Magnetic heat pump 100 of magnetic refrigeration cycle apparatus 202 is driven in the same manner as magnetic heat pump 100 of magnetic refrigeration cycle apparatus 200. In second channel 22 of magnetic refrigeration cycle apparatus 202, similar to second channel 22 of magnetic refrigeration cycle apparatus 200, the heat transport medium cooled in magnetic heat pump 100 exchanges heat with another heat transport medium in second heat exchanger 24.

In magnetic refrigeration cycle apparatus 202, when first valve 27 and second valve 28 are closed in a state in which magnetic heat pump 100 is driven, the heat transport medium heated in magnetic heat pump 100 is stored in thermal storage tank 25. The heat transport medium stored in thermal storage tank 25 is kept at a high temperature. Therefore, the larger the amount of heat transport medium stored in thermal storage tank 25, the larger the amount of heat stored in thermal storage tank 25.

Subsequently, when first valve 27 and second valve 28 are opened in a state in which magnetic heat pump 100 is driven, the heat transport medium stored in thermal storage tank 25 flows to first heat exchanger 23 and exchanges heat with another heat transport medium.

At this moment, the heat transport medium flowing through first heat exchanger 23 is hotter than the heat transport medium flowing through first heat exchanger 23 in magnetic refrigeration cycle apparatus 200 that does not include thermal storage tank 25. The temperature difference between two heat transport media exchanging heat in first heat exchanger 23 in magnetic refrigeration cycle apparatus 202 is larger than in magnetic refrigeration cycle apparatus 200. For example, even when heat exchange between two heat transport media is insufficient in first heat exchanger 23 in magnetic refrigeration cycle apparatus 200 due to a relatively high temperature of the other heat transport medium, heat exchange between two heat transport media exchanging heat in first heat exchanger 23 can be sufficiently performed in magnetic refrigeration cycle apparatus 202. The performance of magnetic refrigeration cycle apparatus 202 is therefore higher than the performance of magnetic refrigeration cycle apparatus 200.

In magnetic refrigeration cycle apparatus 202, second channel 22 may include thermal storage tank 25, pump 26, first valve 27, and second valve 28. In this case, when first valve 27 and second valve 28 are closed in a state in which magnetic heat pump 100 is driven, the heat transport medium cooled in magnetic heat pump 100 is stored in thermal storage tank 25. The heat transport medium stored in thermal storage tank 25 is kept at a low temperature.

Subsequently, when first valve 27 and second valve 28 are opened in a state in which magnetic heat pump 100 is driven, the heat transport medium stored in thermal storage tank 25 flows to second heat exchanger 24 and exchanges heat with another heat transport medium.

At this moment, the heat transport medium flowing through first heat exchanger 23 is colder than the heat transport medium flowing through second heat exchanger 24 in magnetic refrigeration cycle apparatus 200 that does not include thermal storage tank 25. The temperature difference between two heat transport media exchanging heat in second heat exchanger 24 in magnetic refrigeration cycle apparatus 202 is larger than in magnetic refrigeration cycle apparatus 200.

In magnetic refrigeration cycle apparatus 202, at least one of first channel 21 and second channel 22 includes thermal storage tank. 25, pump 26, first valve 27, and second valve 28, Both of first channel 21 and second channel 22 may include thermal storage tank 25, pump 26, first valve 27, and second valve 28.

Magnetic refrigeration cycle apparatus 202 may include magnetic heat pump 102 instead of magnetic heat pump 100.

Fifth Embodiment

Figure 12:
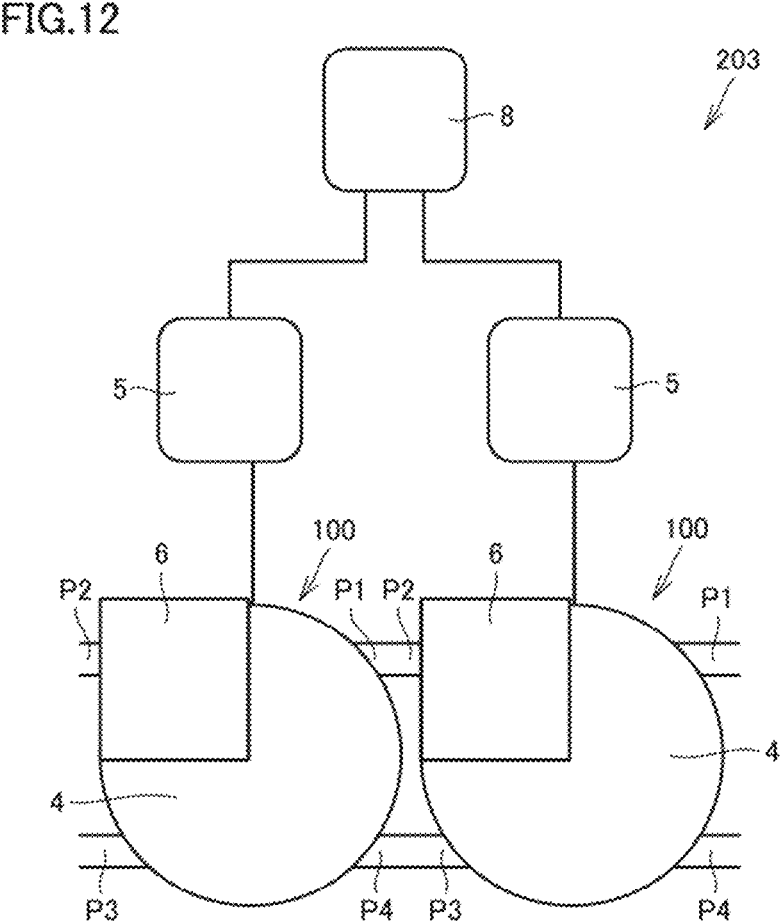
FIG. 12 is a block diagram illustrating a part of a magnetic refrigeration cycle apparatus according to a fifth embodiment.

As illustrated in FIG. 12, a magnetic refrigeration cycle apparatus 203 according to a fifth embodiment basically has a configuration similar to magnetic refrigeration cycle apparatus 200 according to the first embodiment but differs from magnetic refrigeration cycle apparatus 200 in that it includes a plurality of magnetic heat pumps 100 connected in series to each other and a controller 8 that controls the rotation of magnetic heat pumps 100.

Of two magnetic heat pumps 100 illustrated in FIG. 12, magnetic heat pump 100 disposed on the right side is called first magnetic heat pump 100, and magnetic heat pump 100 disposed on the left side is called second magnetic heat pump 100.

First outlet P2 of first magnetic heat pump 100 is connected in series to first inlet P1 of second magnetic heat pump 100. Second outlet P4 of second magnetic heat pump 100 is connected in series to second inlet P3 of first magnetic heat pump 100.

Controller 8 controls the speed of the rotation in the first direction A of each of first magnetic heat pump 100 and second magnetic heat pump 100 such that the flow rate per unit time of the heat transport medium flowing out of first outlet P2 of first magnetic heat pump 100 is equal to the flow rate per unit time of the heat transport medium flowing into first inlet P1 of second magnetic heat pump 100. With this control, the total amount of heat transport medium in the interior space of each of first magnetic heat pump 100 and second magnetic heat pump 100 is kept constant without changing over time. When first magnetic heat pump 100 has the same configuration as second magnetic heat pump 100, controller 8 synchronizes the rotation in the first direction A of first magnetic heat pump 100 with the rotation in the first direction A of second magnetic heat pump 100.

When the flow rate per unit time of the heat transport medium flowing out of first outlet P2 of first magnetic heat pump 100 is different from the flow rate per unit time of the heat transport medium flowing into first inlet P1 of second magnetic heat pump 100, a pressure difference occurs between the heat transport medium in first magnetic heat pump 100 and the heat transport medium in second magnetic heat pump 100, and the heat transport medium having a relatively high pressure may hinder the rotation. If the rotation is hindered, the performance of the magnetic refrigeration cycle apparatus is degraded.

In magnetic refrigeration cycle apparatus 203, controller 8 maintains a state in which the flow rate per unit time of the heat transport medium flowing out of first outlet P2 of first magnetic heat pump 100 is equal to the flow rate per unit time of the heat transport medium flowing into first inlet P1 of second magnetic heat pump 100. In magnetic refrigeration cycle apparatus 203, therefore, degradation in performance due to the hindered rotation is suppressed.

Sixth Embodiment

Figure 13:
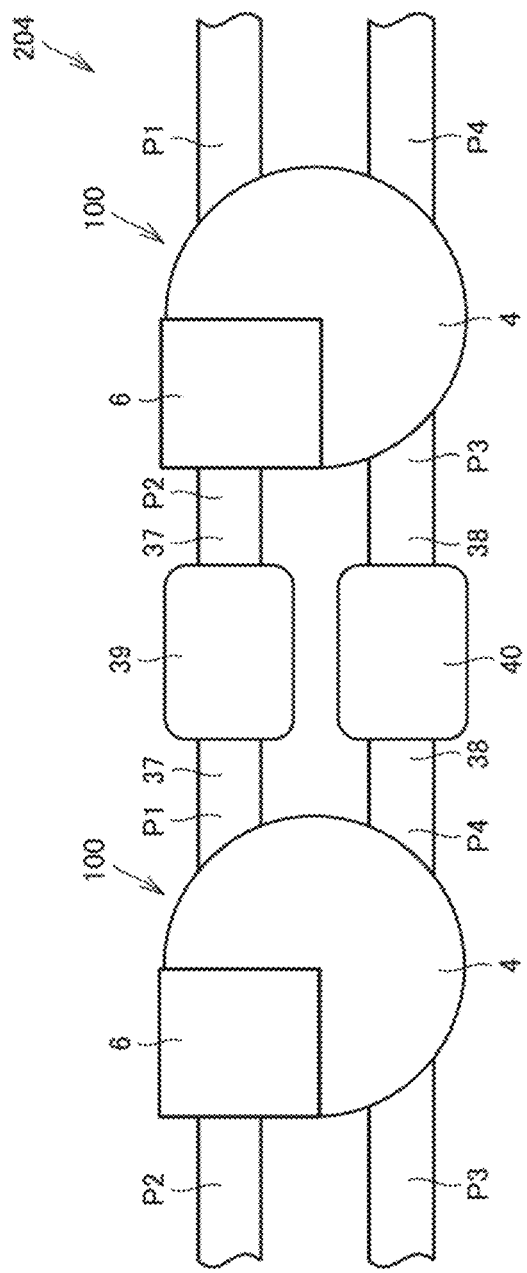
FIG. 13 is a block diagram illustrating a magnetic refrigeration cycle apparatus according to a sixth embodiment.

As illustrated in FIG. 13, a magnetic refrigeration cycle apparatus 204 according to a sixth embodiment basically has a configuration similar to magnetic refrigeration cycle apparatus 200 according to the first embodiment hut differs from magnetic refrigeration cycle apparatus 200 in that it includes a plurality of magnetic heat pumps 100, a third channel 37 and a fourth channel 38 connecting a plurality of magnetic heat pumps 100 in series, and reservoirs 39 and 40 included in third channel 37 and fourth channel 38.

Of two magnetic heat pumps 100 illustrated in FIG. 13, magnetic heat pump 100 disposed on the right side is called first magnetic heat pump 100, and magnetic heat pump 100 disposed on the left side is called second magnetic heat pump 100.

Third channel 37 connects first outlet P2 of first magnetic heat pump 100 and first inlet P1 of second magnetic heat pump 100 in series. Fourth channel 38 connects second outlet P4 of second magnetic heat pump 100 and second inlet P3 of first magnetic heat pump 100 in series.

Reservoir 39 is included in third channel 37. Reservoir 39 stores part of the heat transport medium flowing through third channel 37. Reservoir 40 is included in fourth channel 38. Reservoir 40 stores part of the heat transport medium flowing through fourth channel 38. The amount of heat transport medium stored in each of reservoir 39 and reservoir 40 may change over time.

When at least one of the flow rate per unit time of the heat transport medium flowing out of first outlet P2 of first magnetic heat pump 100 and the flow rate per unit time of the heat transport medium flowing into first inlet P1 of second magnetic heat pump 100 changes over time, a pressure difference occurs between the heat transport medium in first magnetic heat pump 100 and the heat transport medium in second magnetic heat pump 100, and the heat transport medium having a relatively high pressure may hinder the rotation. If the rotation is hindered, the performance of the magnetic refrigeration cycle apparatus is degraded.

In magnetic refrigeration cycle apparatus 204, since the flow rate difference is reduced by the heat transport medium flowing out of each of reservoir 39 and reservoir 40, a pressure difference is less likely to occur between the heat transport medium in first magnetic heat pump 100 and the heat transport medium in second magnetic heat pump 100. In Magnetic refrigeration cycle apparatus 203, therefore, degradation in performance due to the hindered rotation is suppressed.

Refrigeration cycle apparatus 204 may further include controller 8 in the same manner as magnetic refrigeration cycle apparatus 203.

<Modifications>

In magnetic heat pump 100, 101, impeller 2 has at least one accommodation chamber 2C or accommodation chamber 12C. Magnetic heat pump 100, 101 includes at least one magnetocaloric member 1 or magnetocaloric member 11 and at least one deformable member 3 or deformable member 13.

In magnetic heat pump 100, magnetocaloric member 1 does not necessarily have slits 1A. Similarly, in magnetic heat pump 102, magnetocaloric member 11 does not necessarily have slits 11A. Magnetocaloric member 1 and magnetocaloric member 11 may include a plurality of particles made of a magnetocaloric material in magnetocaloric member 1 and magnetocaloric member 11, a plurality of minute gaps are formed between adjacent particles and the minute gaps are continuous to each other. The minute gaps continuous to each other form a plurality of channels through which a heat transport medium flows. Therefore, the area of the heat transfer surface in contact with the heat transport medium in magnetocaloric member 1 and magnetocaloric member 11 is larger than when magnetocaloric member 1 and magnetocaloric member 11 do not contain a plurality of particles made of a magnetocaloric material.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST 1, 11 magnetocaloric member, 1A, 11A slit, 2C, 12C accommodation chamber, 2, 12 impeller, 2A base, 28 vane, 3, 13 deformable member, 3A stationary part, 3B1, 3D1, 12B outer peripheral surface, 3B movable part, 3C first elastic part, 3D connecting part, 4, 14 casing, 4A, 14A first inner peripheral surface, 5, 15 electric motor, 5A shaft, 6, 16 magnetic field generator, 7 guide member, 7A1 first surface portion, 7A2 second surface portion, 7A3 third surface portion, 7A4 fourth surface portion, 7A second inner peripheral surface, 8 controller, 12A central part, 13A inner peripheral portion, 13B outer peripheral portion, 14A1 ninth surface portion, 14A2 tenth surface portion, 14A3 eleventh surface portion, 14A4 twelfth surface portion, 21, 31 first channel, 22, 32 second channel, 21A first line, 21B second line, 23 first heat exchanger, 24 second heat exchanger, 25 thermal storage tank, 26 pump, 27 first valve, 28 second valve, 29, 30 branch line, 33, 34, 35, 36 valve, 37 third channel, 38 fourth channel, 39, 40 reservoir, 100, 101, 102 magnetic heat pump, 200, 201, 202, 203, 204 magnetic refrigeration cycle apparatus, P1 first inlet, P2 first outlet, P3 second inlet, P4 second outlet.

The invention claimed is:

1. A magnetic heat pump comprising:
at least one magnetocaloric member made of a magnetocaloric material;
an impeller having a center axis and at least one accommodation chamber aligned in a circumferential direction with respect to the center axis and accommodating the at least one magnetocaloric member;
at least one deformable member facing the at least one accommodation chamber and having a shape individually changing;
a casing having an interior space accommodating the at least one magnetocaloric member, the impeller, and the at least one deformable member and allowing a heat transport medium to circulate, a first inlet for the heat transport medium to flow into the interior space, and a first outlet spaced apart from the first inlet in the circumferential direction and for the heat transport medium to flow out of the interior space;
an electric motor to integrally rotate the impeller, the at least one magnetocaloric member, and the at least one deformable member in a first direction from the first inlet toward the first outlet in the circumferential direction; and
a magnetic field generator including a magnet configured to produce a magnetic field becoming stronger along the first direction, in a first region extending from the first inlet to the first outlet in the first direction in the interior space, wherein
the at least one accommodation chamber is open toward an outside of the impeller in a radial direction with respect to the center axis,
the shape of the at least one deformable member individually changes with a rotation of the impeller,
the at least one accommodation chamber has a volume individually increasing and decreasing with the change of the shape of the at least one deformable member, and
the volume when the at least one accommodation chamber is located in the first region is larger than the volume when the at least one accommodation chamber is located in a second region located backward of the first inlet in the first direction and the volume when the at least one accommodation chamber is located in a third region located forward of the first outlet in the first direction.

2. The magnetic heat pump according to claim 1, wherein
the at least one deformable member includes
a movable part moving in the radial direction relative to the at least one magnetocaloric member in an interior of the at least one accommodation chamber,
the magnetic heat pump further comprises a guide member having a fixed position relative to the casing, the guide member guiding the movable part moving in the circumferential direction with the rotation, in the radial direction,
the casing has a first inner peripheral surface facing the interior space and facing inwardly in the radial direction,
the volume of the at least one accommodation chamber is a volume of a space located on the outside of the movable part in the radial direction in the at least one accommodation chamber, and
a distance in the radial direction between the movable part and the first inner peripheral surface when the movable part is located in the first region is longer than a distance in the radial direction between the movable part and the first inner peripheral surface when the movable part is located in the second region or the third region.

3. The magnetic heat pump according to claim 2, wherein
the at least one deformable member further includes
a stationary part fixed relative to the at least one magnetocaloric member, and
a first elastic part having a first end portion connected to the stationary part and a second end portion connected to the movable part and located on a side opposite to the first end portion, the first elastic part being elastically deformed in the radial direction,
the guide member has a second inner peripheral surface facing inwardly in the radial direction,
the movable part is pressed by the first elastic part against the second inner peripheral surface of the guide member,
the second inner peripheral surface of the guide member has a first portion disposed in the first region, a second portion disposed in the second region, and a third portion disposed in the third region, and
a distance in the radial direction between the first portion and the first inner peripheral surface is longer than a distance in the radial direction between the second portion and the first inner peripheral surface and a distance in the radial direction between the third portion and the first inner peripheral surface.

4. The magnetic heat pump according to claim 2, wherein
the at least one magnetocaloric member has at least one slit extending along an extending direction of the center axis of the impeller and the radial direction, and
the movable part has a portion inserted in the at least one slit of the at least one magnetocaloric member.

5. The magnetic heat pump according to claim 1, wherein
the at least one deformable member includes
an inner peripheral portion disposed in the radial direction, and
an outer peripheral portion disposed on the outside of the inner peripheral portion in the radial direction and elastically deformed relative to the inner peripheral portion,
the at least one accommodation chamber is divided by the at least one deformable member,
the casing has an inner peripheral surface facing the interior space and facing inwardly in the radial direction,
the inner peripheral surface of the casing has a fourth portion disposed in the first region, a fifth portion disposed in the second region, and a sixth portion disposed in the third region in the first direction, the outer peripheral portion is provided in contact with each of the fifth portion and the sixth portion, and a length in the radial direction of the outer peripheral portion when the at least one deformable member is located in the first region is longer than a length in the radial direction of the outer peripheral portion when the at least one deformable member is located in the second region or the third region.

6. The magnetic heat pump according to claim 5, wherein a distance in the radial direction between the fourth portion and the inner peripheral portion is longer than a distance in the radial direction between the fifth portion and the inner peripheral portion and a distance in the radial direction between the sixth portion and the inner peripheral portion.

7. The magnetic heat pump according to claim 1, wherein the magnetic field generator includes at least one of an electromagnet and a superconducting magnet as the magnet.

8. The magnetic heat pump according to claim 1, wherein the casing further has a second inlet for the heat transport medium to flow into the interior space, and a second outlet spaced apart from the second inlet in the circumferential direction for the heat transport medium to flow out of the interior space, the second inlet is disposed forward of the first outlet in the first direction, and the second outlet is disposed forward of the second inlet in the first direction, the magnetic field generator produces the magnetic field becoming weaker along the first direction in the third region, the volume when the at least one accommodation chamber is located in a fourth region is larger than the volume when the at least one accommodation chamber is located in the second region and the volume when the at least one accommodation chamber is located in the third region.

9. A magnetic refrigeration cycle apparatus comprising: the magnetic heat pump according to claim 1;

a first channel connecting the first inlet and the first outlet in parallel with a second channel; and a switch to switch between a first state in which the magnetic heat pump is connected to the first channel and not connected to the second channel and a second state in which the magnetic heat pump is connected to the second channel and not connected to the first channel.

10. A magnetic refrigeration cycle apparatus comprising: the magnetic heat pump according to claim 8;

a first channel having one end connected to the first inlet and the other end connected to the first outlet and allowing the heat transport medium to flow; and a second channel having one end connected to the second inlet and the other end connected to the second outlet and allowing the heat transport medium to flow.

11. The magnetic refrigeration cycle apparatus according to claim 10, wherein the first channel includes a thermal storage tank to store the heat transport medium.

12. A magnetic refrigeration cycle apparatus comprising: a first magnetic heat pump;

a second magnetic heat pump, wherein each of the first magnetic heat pump and the second magnetic heat pump is configured as the magnetic heat pump according to claim 1, and the first outlet of the first magnetic heat pump is connected in series to the first inlet of the second magnetic heat pump; and a controller to control a speed of the rotation of each of the first magnetic heat pump and the second magnetic heat pump such that a flow rate per unit time of the heat transport medium flowing out of the first outlet of the first magnetic heat pump is equal to a flow rate per unit time of the heat transport medium flowing into the first inlet of the second magnetic heat pump.

13. A magnetic refrigeration cycle apparatus comprising: a first magnetic heat pump;

a second magnetic heat pump, wherein each of the first magnetic heat pump and the second magnetic heat pump is configured as the magnetic heat pump according to claim 1;

a channel connecting the first outlet of the first magnetic heat pump and the first inlet of the second magnetic heat pump in series; and a reservoir disposed in the third channel, the reservoir storing the heat transport medium.

14. The magnetic heat pump according to claim 3, wherein the at least one magnetocaloric member has at least one slit extending along an extending direction of the center axis of the impeller and the radial direction, and the movable part has a portion inserted in the at least one slit of the at least one magnetocaloric member.

15. The magnetic heat pump according to claim 2, wherein the magnetic field generator includes at least one of an electromagnet and a superconducting magnet as the magnet.

16. The magnetic heat pump according to claim 3, wherein the magnetic field generator is provided to change a strength of the magnetic field.

17. The magnetic heat pump according to claim 4, wherein the magnetic field generator includes at least one of an electromagnet and a superconducting magnet as the magnet.

18. The magnetic heat pump according to claim 14, wherein the magnetic field generator includes at least one of an electromagnet and a superconducting magnet as the magnet.

19. The magnetic heat pump according to claim 5, wherein the magnetic field generator includes at least one of an electromagnet and a superconducting magnet as the magnet.

20. The magnetic heat pump according to claim 6, wherein the magnetic field generator includes at least one of an electromagnet and a superconducting magnet as the magnet.

* * * * *